US009399526B2

(12) United States Patent
Cheriere et al.

(10) Patent No.: US 9,399,526 B2
(45) Date of Patent: *Jul. 26, 2016

(54) METHOD, DEVICES AND PROGRAM FOR COMPUTER-AIDED PREVENTIVE DIAGNOSTICS OF AN AIRCRAFT SYSTEM, USING CRITICAL EVENT CHARTS

(71) Applicants: Airbus Operations (SAS), Toulouse (FR); Airbus, Blagnac (FR)

(72) Inventors: Vincent Cheriere, Montastuc la Conseillere (FR); Jeremy Roger, Toulouse (FR); Vincent Debray, Castelginest (FR); Benjamin Fabre, Beauzelle (FR); Philippe Chantal, Tournefeuille (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 152 days.

This patent is subject to a terminal disclaimer.

(21) Appl. No.: 13/861,191

(22) Filed: Apr. 11, 2013

(65) Prior Publication Data
US 2013/0274992 A1 Oct. 17, 2013

(30) Foreign Application Priority Data
Apr. 12, 2012 (FR) ...................................... 12 53383

(51) Int. Cl.
G01C 23/00 (2006.01)
G05D 1/00 (2006.01)
G05D 3/00 (2006.01)
(Continued)

(52) U.S. Cl.
CPC ............ B64F 5/0081 (2013.01); G06F 11/079 (2013.01); G06F 11/0739 (2013.01); G05B 23/0248 (2013.01)

(58) Field of Classification Search
None
See application file for complete search history.

(56) References Cited

U.S. PATENT DOCUMENTS

| 2003/0070108 A1 | 4/2003 | Groen et al. |
| 2006/0095230 A1* | 5/2006 | Grier ................. G05B 23/0216 702/183 |
| 2006/0161819 A1 | 7/2006 | Nissan-Messing et al. |
| 2008/0177515 A1 | 7/2008 | Saintis |
| 2009/0083576 A1* | 3/2009 | Vlassova ............ G06F 17/5009 714/26 |

FOREIGN PATENT DOCUMENTS

| FR | 2910986 | 4/2008 |
| WO | 03032249 | 4/2003 |

OTHER PUBLICATIONS

French Search Report, Oct. 3, 2012.
(Continued)

Primary Examiner — Yonel Beaulieu
Assistant Examiner — Lail Kleinman
(74) Attorney, Agent, or Firm — Greer, Burns & Crain, Ltd.

(57) ABSTRACT

Aided preventive diagnostics of an aircraft system, comprising a plurality of subsystems at least one of which comprises a subsystem configured for monitoring and notifying a detected event, using critical event charts. After receiving a message notifying the occurrence of said detected event, a minimal diagnostic set relative to said at least one detected event, comprising a plurality of elements each represented by a node of said critical event chart is created, each element of said minimal diagnostic set being determined according to at least one logical implication relation of said critical event chart with a node representing said at least one received notification message. At least some of the elements of said minimal diagnostic set are then ranked, said ranked elements forming part of said diagnostic report.

16 Claims, 11 Drawing Sheets

(51) Int. Cl.
- *G06F 7/00* (2006.01)
- *G06F 17/00* (2006.01)
- *G01M 17/00* (2006.01)
- *G06F 11/30* (2006.01)
- *G06F 19/00* (2011.01)
- *G07C 5/00* (2006.01)
- *B64F 5/00* (2006.01)
- *G06F 11/07* (2006.01)
- *G05B 23/02* (2006.01)

(56) References Cited

OTHER PUBLICATIONS

Notice of Violation of IEEE publication Principles—Decision Trees Generation Based on Fault Trees Analysis, Tao Yongjian et al., May 15, 2009.

Minimal cut set/sequence generation for dynamic fault trees, Zhihua Tang et al., Jan. 26, 2004.

* cited by examiner

METHOD, DEVICES AND PROGRAM FOR COMPUTER-AIDED PREVENTIVE DIAGNOSTICS OF AN AIRCRAFT SYSTEM, USING CRITICAL EVENT CHARTS

CROSS-REFERENCES TO RELATED APPLICATIONS

This application claims the benefit of the French patent application No. 1253383 filed on Apr. 12, 2012, the entire disclosures of which are incorporated herein by way of reference.

BACKGROUND OF THE INVENTION

The present invention relates to the diagnosis of elements of complex systems, in particular of aircraft, and more particularly to a method, devices and a program for computer-aided preventive diagnostics of an aircraft system, using critical event charts.

The latest failure diagnosis systems in aircraft generally use failure models designed by the manufacturers and their equipment suppliers during the aircraft development cycle. They can be used for the purpose of setting up preventive diagnostics on board the aircraft in question or on the ground via web services for example.

These diagnostic systems can use messages originating from equipment monitoring systems comprising self-diagnosis software applications, also called built-in test equipment (BITE), reporting maintenance messages involving items of equipment suspected of failure as soon as the monitoring systems detect them.

Thus, for example, the diagnostic systems known as on-board maintenance systems (OMS), in particular used in the Airbus A380 (Airbus and A380 are trade marks) make it possible to group messages received from equipment monitoring systems and to access reports generated in flight in order to carry out statistical analysis allowing potential future failures to be identified.

The grouping of messages is here carried out by a software application of a centralized maintenance system (CMS) which collects and consolidates these maintenance messages in order to identify the more relevant maintenance messages allowing the maintenance teams on the ground to complete the necessary repairs. Such messages indicate failed equipment as well as providing information on possible failures based on statistical analyses such as mean time between failures (MTBF).

Access to reports generated in flight typically involves access to reports known as aircraft condition monitoring system (ACMS) reports which are generated systematically at certain phases of each flight or when particular events are detected, for example when a predetermined threshold is exceeded by a given parameter of the aircraft. Such reports thus represent a view of the status of a certain number of parameters and equipment of the aircraft. When collated, these ACMS reports allow the airline operating the aircraft to monitor its status and to intervene when deemed necessary.

The ability to prevent possible effects of future failures in the cockpit (called flight deck effect (FDE)) is offered by some aircraft manufacturers in a ground system called airplane health management (AHM) interfaced with the reports issued by an aircraft. To this end, the AHM calculates and adapts a time remaining for carrying out maintenance (called time to failure (TTF)) for the maintenance messages reported by a centralised maintenance computing function (CMCF) of the aircraft and based on the history of these messages.

In order to plan preventive maintenance tasks, an airline needs to have advance knowledge of a future dysfunction. But this is not sufficient on recent-generation aircraft where the systems are very interdependent, incorporate components with complex malfunction modes, and have architectures that have single failure tolerance.

A failure tolerance capability allows an aircraft to remain available even if an item of equipment has failed. A list of the minimum operational equipment (called minimum equipment list (MEL)) sets the conditions according to which an aircraft in which at least one item of equipment has failed can remain operational (dispatch reliability). By way of illustration, an airline can be permitted to operate an aircraft for 10 days with certain equipment failed. Thus, these operating conditions are encompassed by the MEL and are often accompanied by mandatory maintenance operations to inspect the equipment in working order associated with the failed equipment and/or to provide safe manual deactivation of the failed equipment.

A failure tolerance capability also allows an airline to operate an aircraft while, at the same time, preparing for the purchase and procurement of spares as well as the associated maintenance.

In this context, it is necessary not only to obtain a list of equipment failures in an aircraft in order to decide on its operation but moreover, the airline operating this aircraft wishes to know exactly the tolerance margin remaining before a dysfunction with greater impact occurs, for example a situation named NO GO in the MEL, which does not permit the airline to operate the aircraft in this condition or a situation according to which the passenger experience would not accord with the image the airline wishes to project (for example if the cabin video system no longer functions).

There is a need to provide predictive maintenance and failure tolerance information.

SUMMARY OF THE INVENTION

The invention makes it possible to resolve at least one of the problems previously set out.

A subject of the invention is thus a method for the computer-aided preparation of a diagnostic report for a complex system of an aircraft comprising a plurality of subsystems, at least one subsystem of said plurality of subsystems comprising means of monitoring and notification of at least one detected event, this method being characterized in that:

it implements a critical event chart at least partially modelling said complex system, said critical event chart comprising a plurality of nodes, each node of said plurality of nodes being linked by a logical implication relation to at least one other node of said plurality of nodes, said plurality of nodes comprising, a plurality of nodes each representing a notification message capable of being received;

at least one node representing a critical event; and, a plurality of nodes each representing an element of said complex system, each element represented by a node being liable to failure;

it comprises the following steps, receiving at least one notification message of the occurrence of said at least one detected event;

creating a minimal diagnostic set relative to said at least one detected event, comprising a plurality of elements each represented by a node of said critical event chart, each element of said minimal diagnostic set being determined according to at least one logical implication relation of said critical event chart with a node representing said at least one received notification message; and ranking at least some of the elements of said minimal diagnostic set, said ranked elements forming part of said diagnostic report.

The method according to the invention makes it possible in particular to facilitate decision-making on the ground, for example by the maintenance control centre of the aircraft operating company because the diagnostic result is classified by relevance. Moreover, this method being based on physical and topological knowledge of the system, for example physical and topological knowledge of the aircraft consistent with failure mode effects analysis (FMEA) and the minimum equipment list (MEL), it allows in particular information to be obtained on the remaining failure tolerance margin based on the knowledge of the architecture of the systems. It also allows awareness of a list of the equipment still remaining operational, heading towards a future significant dysfunction. This information can be obtained in real time and transmitted to a remote system, for example of an aircraft in flight to a system on the ground.

Said critical event chart can be at least partially generated by instantiation of at least one generic subchart in order to simplify the creation and management thereof.

According to a particular embodiment, the method comprises moreover a step of obtaining data representative of a diagnostic history of said complex system, said ranking step being at least partially based on said data representative of said diagnostic history.

Thus by using the diagnostic history in order to consolidate a degree of certainty of analysis by ranking diagnostic results on which a preventive analysis can be based, it is possible to promote maintenance of the more often suspected candidate items, which avoids leaving an item in unresolved failure for too long. This is particularly useful in the case of operation of an aircraft that does not return to its main base after a series of flights and on which different maintenance teams work. In fact, in this case, the maintenance operatives are not the same staff from one airport to another, only making a spot check on the aircraft in a given airport. The results obtained using the steps described previously make it possible to benefit from previous diagnostic histories. Moreover, the method makes it possible to facilitate decision-making on the ground, for example by the maintenance control centre of the aircraft operating company because the diagnostic result will already be classified as a function of the history, avoiding the need for the staff of this centre to carry out the work manually from flight to flight.

Still according to a particular embodiment, said step of ranking at least some of the elements of said minimal diagnostic set comprises a step of ranking at least some of said minimal diagnostics.

The method comprises moreover, preferably, a step of calculating the persistence weighting of each element of a plurality of elements of said minimal diagnostic set, said persistence weighting calculation being based on the presence of each element of said plurality of elements of said minimal diagnostic set in a minimal diagnostic set of said diagnostic history, said ranking of at least some of said minimal diagnostics being at least partially based on results of said persistence weighting calculation.

Still according to a particular embodiment, the method comprises moreover a step of prioritizing elements of said minimal diagnostic set.

Said step of ranking at least some of the elements of said minimal diagnostic set comprises, preferably, a step of ranking problems resulting from said minimal diagnostics. According to a particular embodiment, the method comprises moreover a step of calculating the persistence weighting of each problem of a plurality of problems resulting from said minimal diagnostics, said ranking of problems being at least partially based on results of said persistence weighting calculation.

Still according to a particular embodiment, the method comprises moreover a step of selecting at least one receivable notification message represented by a node of said critical event chart, and a step of identifying the elements of said minimal diagnostic set capable of leading to the generation of said at least one selected notification message, said identified elements forming part of said diagnostic report. Attributes can be obtained and assigned to said identified elements.

The method according to the invention thus uses exhaustive physical knowledge to indicate candidate items that are not yet declared to have failed but a malfunction of which could result in a critical event. This information is very important for decision-making. In fact, such information makes it possible, for example, to prevent an aircraft departing if the tolerance margin is due only, for example, to the life of a line-replaceable unit (LRU) that is very expensive to send to the place of destination of the aircraft. In this case, the risk of a long immobilization of the aircraft while waiting for a replacement LRU is high. On the other hand, if the tolerance margin is encroached but the logistics and maintenance of the replacement parts do not pose a problem in terms of costs and operationally, it is less risky to allow the aircraft to depart.

Advantageously, the method comprises moreover a step of calculating the remaining distance before the imminent effect for at least one of said identified elements, said remaining distance being calculated as a function of the number of elements that do not form part of said minimal diagnostic set and a malfunction of which is necessary to the generation of said at least one selected notification message.

Still according to a particular embodiment, the method comprises moreover a step of selecting at least one failure resolution procedure involving at least one element of said minimal diagnostic set.

A subject of the invention is also a computer program comprising instructions stored in a non-transient memory adapted to the implementation of each of the steps of the previously-described method when said program is executed on a computer as well as an aircraft maintenance system comprising a calculator comprising means for implementing each of the steps of the previously-described method. The advantages achieved by this computer program and this system are similar to those mentioned previously.

BRIEF DESCRIPTION OF THE DRAWINGS

Other advantages, aims and features of the present invention will become apparent from the detailed description which follows, by way of non-limitative example, with reference to the attached drawings in which:

FIG. 6, comprising

FIG. 8, comprising

DETAILED DESCRIPTION OF THE PREFERRED EMBODIMENTS

In general, the invention relates to a system of preventive diagnosis and failure tolerance analysis for an aircraft system, using critical event charts (or failure condition graphs) constructed here on the basis of fault trees developed during safety studies.

Figure 1:
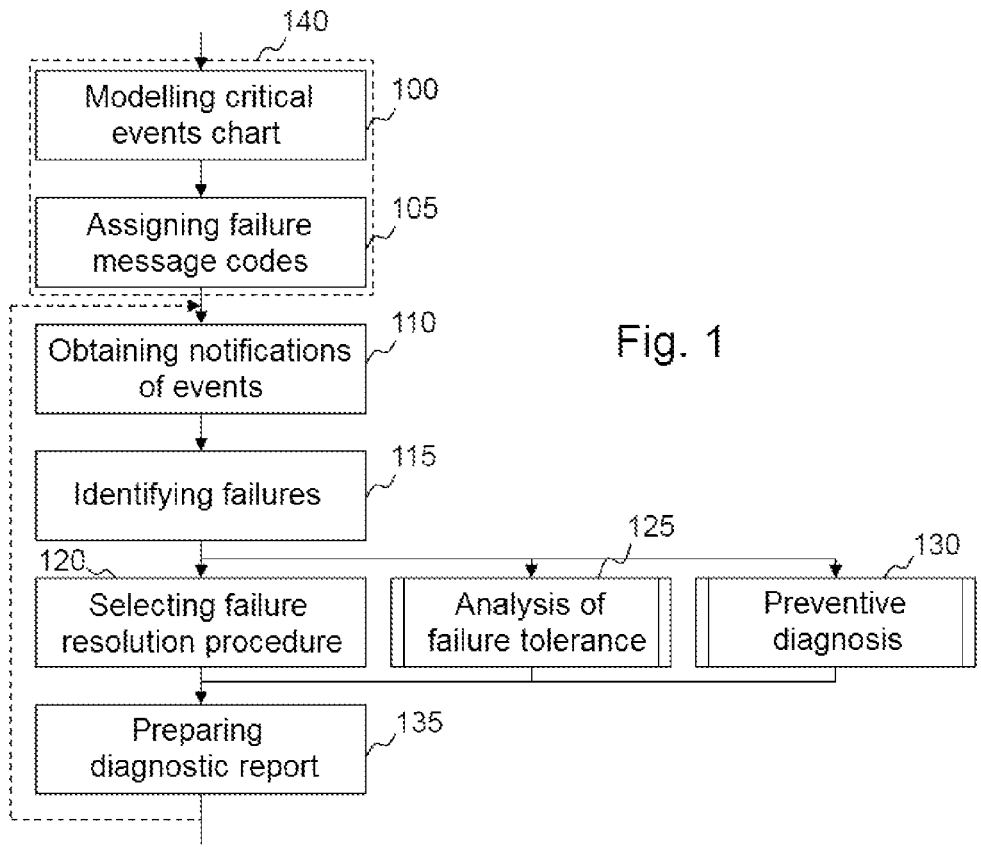
FIG. 1 represents diagrammatically certain steps of a method for producing diagnostic aid for an aircraft system.

As shown in FIG. 1, the general method for preparing a diagnostic report is here broken down into several phases. A first phase (phase 100) relates to modelling a critical event chart. An example of such modelling is described with reference to FIGS. 2 and 3. A second phase (phase 105) relates to assigning failure message codes to the previously-modelled critical event chart. A third phase (phase 110) consists of obtaining real-time or deferred event-detection notifications issued by the aircraft monitoring systems. In a fourth phase (phase 115), a failure identification algorithm is executed by a machine in order to provide an aircraft diagnostic aid on the basis of the detected events and of the modelled critical event chart.

After identification of failures, several steps and/or sequences of steps are carried out independently in order to select an optimum failure resolution procedure for each item of equipment that could potentially fail, the malfunction of which could result in the current configuration of the system (phase 120), analyze the failure tolerance of the system in its current configuration (phase 125) and issue a preventive diagnosis thereof (phase 130). The results obtained during these steps allow a diagnostic report to be prepared (phase 135).

As shown by the arrow in broken lines, the latter phases are, preferably, repeated in order to allow analysis of all the detected events, for example as they are detected.

According to a particular embodiment, the modelling of the critical event chart is carried out on the basis of modelling charts of the critical events of several aircraft systems, preferably all. The critical event chart can be regarded as the extension of the fault trees developed during the safety studies. Here it has the following features:

the chart is directed, it can comprise cycles;

the chart comprises at least three types of node:

candidate items denoting equipment, preferably replaceable items, in particular calculators of the line replaceable unit (LRU) type, software applications, cables and operating conditions such as resets of an item of equipment showing a malfunction or abnormal operating conditions of a system (such as for example an engine overboost, skidding on braking or operation in the presence of ice on the air intakes). A particular attribute is advantageously denoted in order to classify each "candidate item" node according to two groups, persistent candidate items and non-persistent candidate items. The persistent candidate items are such that having once failed, their failure is irreversible without maintenance action. The non-persistent candidate items are all others;

critical event, also called failure condition, denoting system malfunction conditions modelled by the chart; and, logic gates denoting logic operations, for example the logic operations OR, AND, negation (NOT) or a gate of the "n AMONG" type (where n is a natural non-zero integer representing an activation threshold);

each arc of the chart is a directed arc representing a logical implication relation between the two nodes that it links, it being possible to consider the origin of the arc as a cause and the destination as an effect;

the set of nodes of the chart covers the set of the failure mode, effects and criticality analysis (FMEA) fault trees produced for safety analysis (system safety analysis or FMEA system). In other words, any fault tree shown in the FMEA system is a subchart of the critical event chart;

the set of candidate item type nodes comprises the set of line replaceable units or modules (LRU and LRM) considered in the maintenance manuals known as TSM and AMM; and, the set of functional failures defined in the MSG-3 type analysis of the system in question is included in the set of critical event type nodes of the chart.

The critical event chart can comprise several thousands of nodes and arcs.

It should be noted that a chart can have a variable level of completeness. For example, the candidate items associated with the wiring can not be shown in an intentionally simplified version of the chart of a system. However, this simplified chart enables a first level of diagnostics that is useful for online maintenance and allows a mode of implementation in which the manufacturer offers a detailed diagnostic service based on a complete chart.

Figure 2:
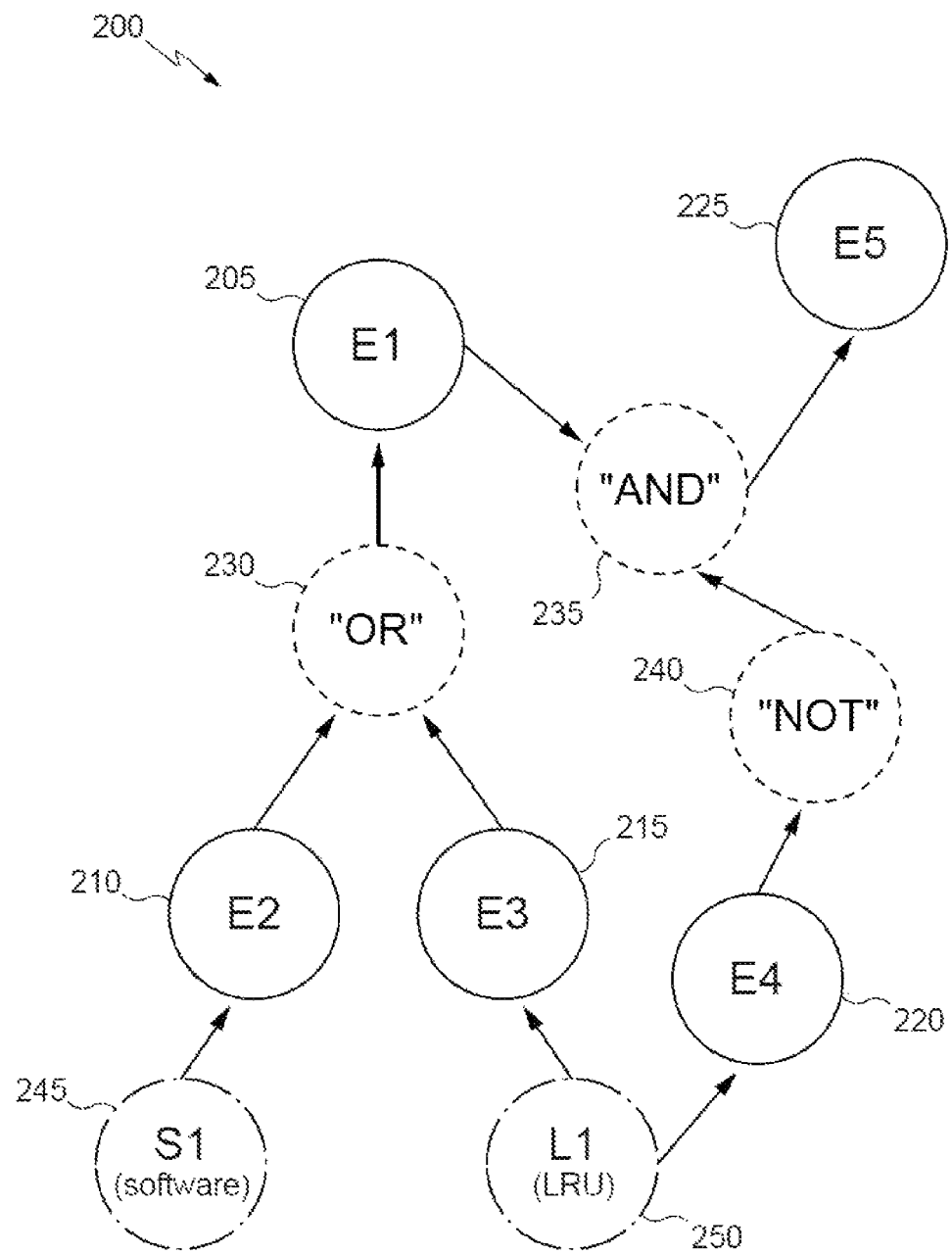
FIG. 2 shows an example critical event chart.

FIG. 2 shows an example of such a critical event chart 200. The circles here represent the nodes of the critical event chart while the arrows represent the arcs of the chart. Circles 205 to 225, in solid lines, represent critical event type nodes, circles 230 to 240, in broken lines, represent logic gate type nodes and circles 245 and 250, dash-dotted lines represent candidate item type nodes. Thus, for example, a fault in the equipment S1 (245), here a software application, is capable of triggering the critical event E2 (210). Similarly, a fault in the equipment L1 (250), here an LRU, is capable of triggering the critical event E3 (215). Moreover, triggering the critical event E2 (210) or the critical event E3 (215) leads to triggering the critical event E1 (205) according to the logic gate OR (230) linking the critical events E2 and E3 to the critical event E1.

Figure 3:
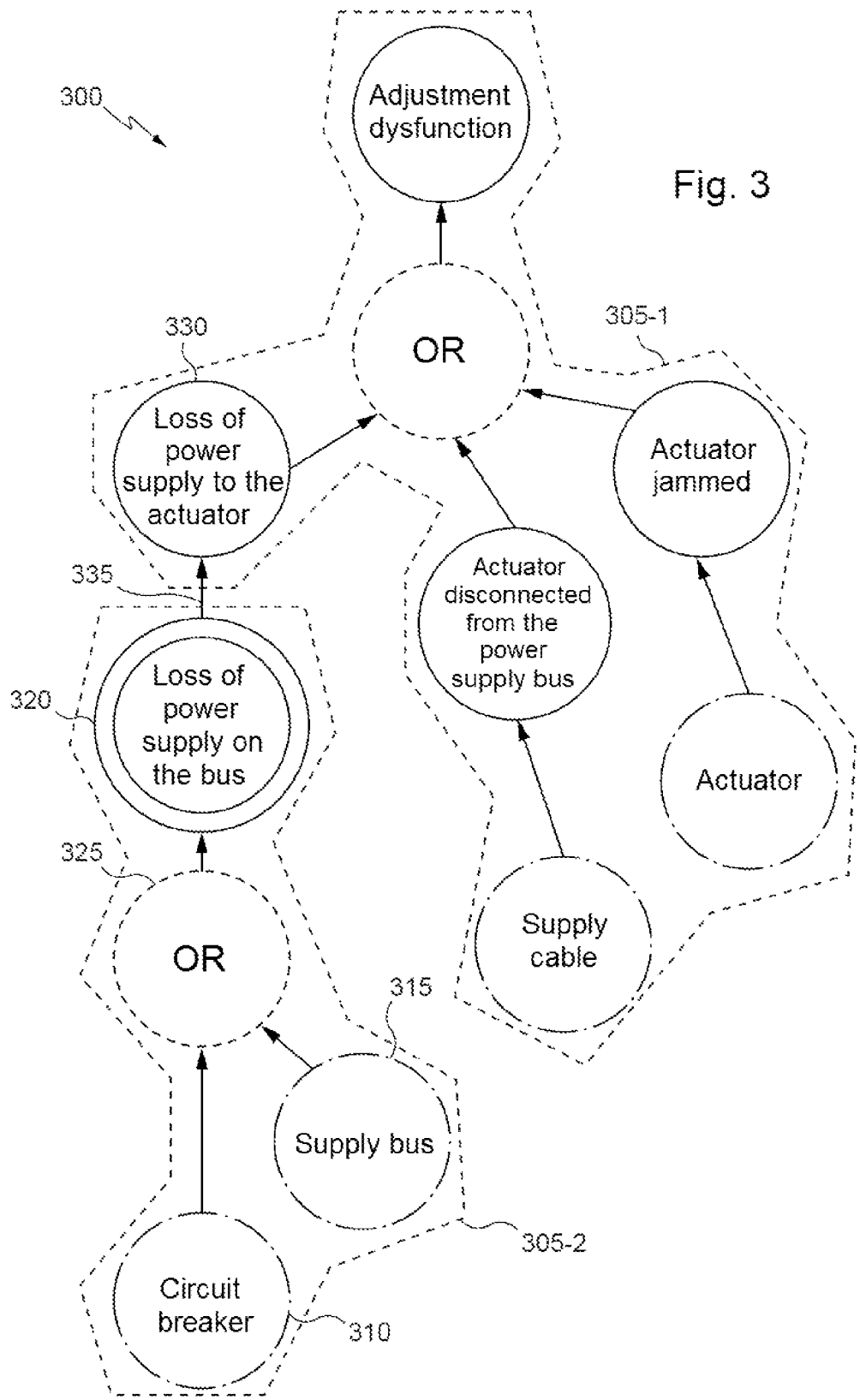
FIG. 3 shows an example critical event chart associated with two systems, each represented by a separate critical event subchart.

Each subsystem of a system can be represented by a critical event subchart. Thus, when a critical event chart is associated with a system comprising several subsystems, each subsystem being associated with a critical event subchart, there are in the critical event chart, critical event type nodes which act as an interface between the critical event subchart, representing cause and effect relationships between the corresponding subsystems. Such nodes are, preferably, identified with a particular attribute. FIG. 3 shows an example of a critical event chart 300 associated with two subsystems, here an actuation type subsystem and a power supply type subsystem, each represented by a separate critical event subchart referenced 305-1 and 305-2, respectively.

Again, the circles represent nodes of the critical event chart and the arrows represent the arcs of the chart. The circles in solid lines represent critical event type nodes, the circles in broken lines represent of the nodes of the logic gates type and the circles in dash-dotted lines represent candidate item type nodes. The circle in double solid lines represents a critical event type node acting as an interface between two systems.

By way of illustration, the detection of a fault in the circuit-breaker 310 or in the main supply bus 315 is a cause of the critical event "loss of power supply on the bus" (320), according to the OR logic gate (325), in the critical event subchart 305-2. The critical event "loss of power supply on the bus" (320) being a node acting as an interface between subcharts 305-1 and 305-2, it is the cause of the critical event "loss of power supply to the actuator" (330) in the critical event subchart 305-1 according to the arc 335.

The advantages of such a representation in the form of a critical event chart are in particular associated with its consistency with models used for performing safety analyses which make it possible, using the same formalism, to represent knowledge of a system, from a high-level critical event to a critical event at the level of a component of the system and thus to combine the knowledge of equipment suppliers and of a manufacturer in a single database. It also allows the establishment of formal evidence, by using the theory of the charts' coverage, that the critical events are, from a safety point of view, satisfactorily covered by the critical event chart used in the diagnostic aid system.

After modelling a critical event chart, a subsequent phase (phase 105 of FIG. 1) relates to identification of the relationships between critical events represented in the critical event chart and events capable of being detected, typically in real time, by BITE monitoring systems of aircraft systems with which the critical event chart is associated, crew members or operatives. The detected events are, for example, notified by messages issued by the corresponding monitoring systems. They can also result from notified human observations.

A maintenance message, fault report, monitoring parameter of the aircraft condition monitoring function (ACMF), a message of the electronic centralised aircraft monitor (ECAM) type, a warning from the flight warning system (FWS) or pilot entries in the electronic logbook are in particular automatic notifications of the occurrence of critical events in an aircraft. These messages as well as, if applicable, similar messages are therefore associated with critical events in the critical event chart. To this end, notification type nodes are added to the critical event chart and directed links are established between these new nodes and critical event type nodes.

Figure 4:
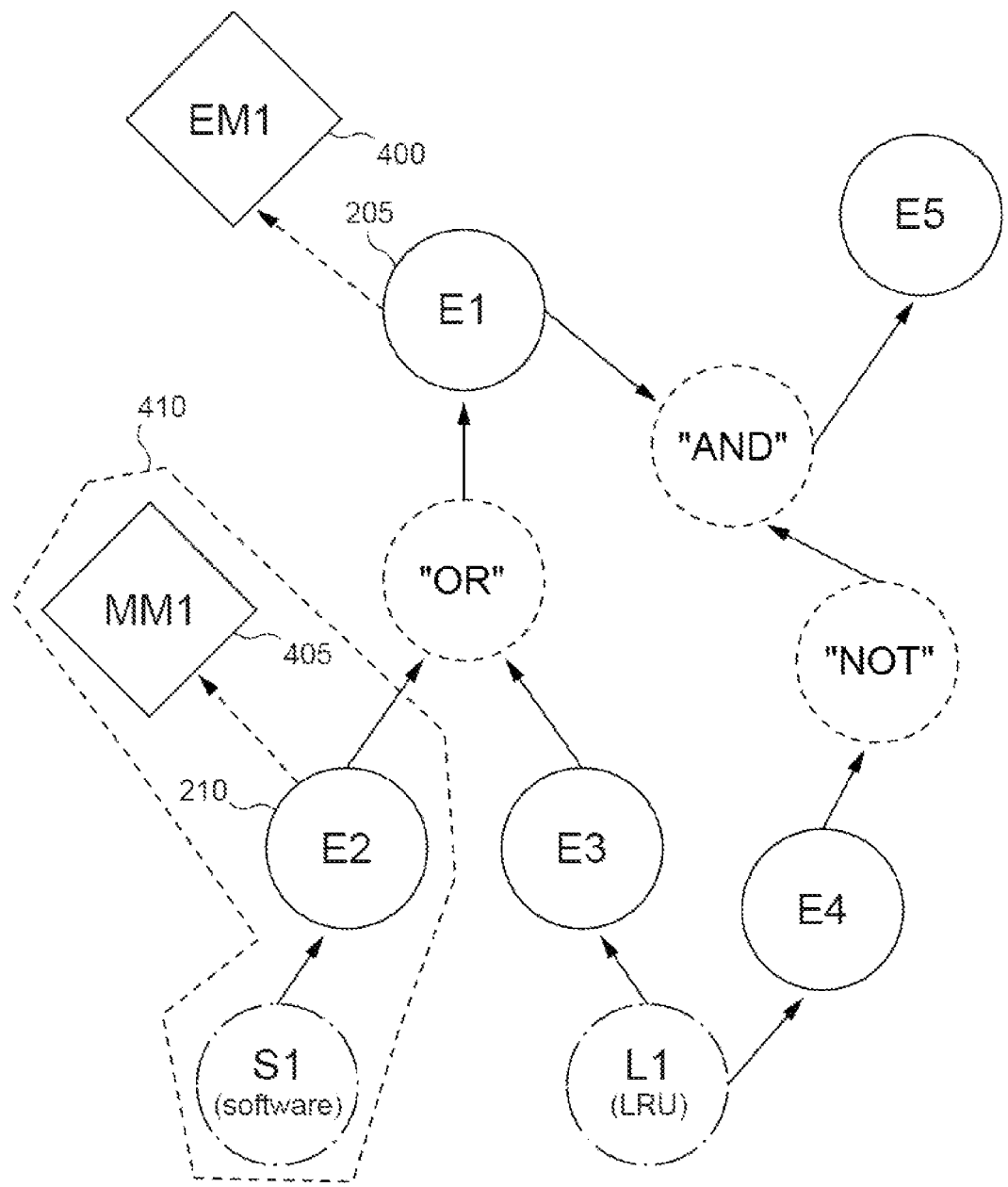
FIG. 4 represents the critical event chart shown in FIG. 2 comprising moreover nodes associated with messages originating from monitoring systems of the system characterized by the critical event chart.

Such a relationship can be established using a simple first-order logic. Thus, for example, as shown in FIG. 4 representing a critical event chart based on that described with reference to FIG. 2, an EM1 message (ECAM type message), here referenced 400, the purpose of which is to prevent the occurrence of an E1 critical event (205) can be shown on the critical event chart by a notification type node, the latter being linked by an arc to the node representing the critical event with which it is associated, i.e. here the E1 critical event (205). Similarly, an MM1 maintenance message (405), the purpose of which is to warn of the occurrence of an E2 critical event (210), is shown here on the critical event chart by a node and linked to the node representing the corresponding critical event.

It is noted here that a detected event, notified by a message, corresponds to a particular instantiation, over time, of a critical event or of a conjunction of critical events. Thus, for the sake of clarity, although the critical event chart here comprises notification type nodes, critical events of the critical event chart can be obtained directly from a notification message without the need to implement notification type nodes in the critical event chart.

By way of illustration, a BITE monitoring unit detecting that a hydraulic fluid pressure value is less than 345 bars and transmitting a corresponding message is a means of notifying the occurrence of the critical event of the "hydraulic pressure too low" type. A link can thus be established between this message and this critical event. Similarly, a monitoring unit detecting that the pressure of a hydraulic accumulator for a brake is less than 8 bars is another means of notifying the critical event of the "hydraulic pressure too low in the accumulator for the braking function" type.

In other words, this phase makes it possible to introduce an item of known information associated with the monitoring systems messages in the previously-modelled critical event chart.

This phase makes it possible in particular, using the same formalism, to group together maintenance messages, messages from the FWS, in particular ECAM type messages and warnings, ACMF monitoring parameters, as well as results of tests carried out on the aircraft on the ground, in connection with the corresponding critical events.

It also makes it possible to obtain a simple representation, on the basis of first-order logic, of detected events in monitoring systems in a critical event chart that is easily understood by non-expert users of the system in question. Moreover, it makes it possible to produce formal evidence of the cover and diagnostic accuracy of the software of the monitoring systems (built-in test) of these systems issuing the maintenance messages, by calculating the critical event subchart generated by the notification nodes and all their predecessors (i.e. all the candidate item type nodes having a logical implication link to the notification-type node in question). Thus, for example, the subchart referenced 410 in FIG. 4 represents the subchart generated by the node corresponding to the notification of the MM1 message (405). A predecessor is here a node of the candidate item type linked to a notification type node, via at least one critical event type node, the predecessor being able to be considered as a cause (determined by the direction of the link between the two nodes).

Independence between the software of the monitoring systems (built-in test) provided by different equipment suppliers is ensured by using interface-type critical events nodes in the model. These nodes facilitate and formalize the specification of the interfaces between systems. Moreover, this representation allows automatic analysis of the consequences, in a single system or in others, of a modification of an item of equipment of the aircraft, in its functionalities or its failure modes. Such an analysis can be carried out using an algorithm that automatically runs through the chart step by step, and listing the critical events that may be generated by this equipment modification.

This phase also allows a manufacturer to define the coverage objectives of the malfunction or failure management procedure (also called troubleshooting) to be achieved with each maintenance message. Finally, it can be used as a reasoning model for troubleshooting on the ground because it represents all the possible branches of dysfunction that could result in a critical event notified in flight.

These phases of modelling critical event charts and assigning failure message codes (phases 100 and 105 of FIG. 1) can be improved to simplify the creation and management of the charts by using chart patterns (also called graph patterns) and instantiation tables.

A chart pattern is here a generic chart in which the nodes representing critical events and candidate items denote events and generic items which can take on as many values as there are similarities in the system in question.

By way of illustration, an aircraft generally has two ventral undercarriages that are symmetrical and similar. It would be unnecessary to analyze and model these two undercarriages because the critical event charts obtained would have the same form, only the names of the nodes would be different, the first chart referring to elements of the left-hand undercarriage and the second to elements of the right-hand undercarriage. Similarly, for assignment of the message codes, if the monitoring techniques of the left-hand undercarriage are similar to those of the right-hand undercarriage, it is unnecessary to perform the analysis twice.

Figure 5:
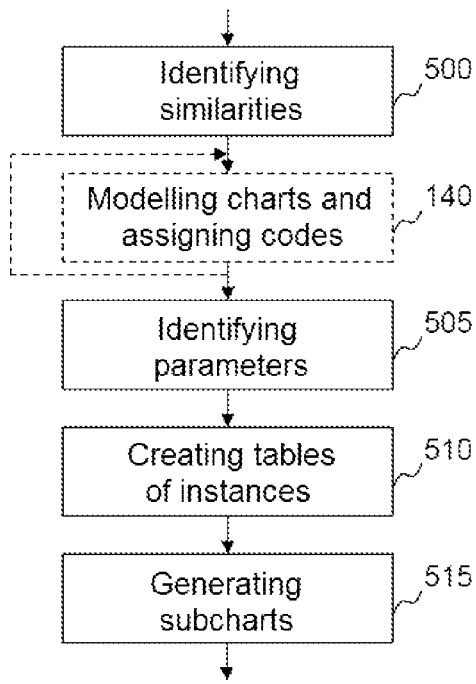
FIG. 5 shows an example of an algorithm for the generation of critical event charts according to similarities.

Thus, steps 100 and 105 of FIG. 1 can be supplemented by steps 500 to 515, as represented in FIG. 5 which shows an example chart generation algorithm.

A first step relates to identifying all the similarities of the system to be modelled (step 500), i.e. all the groups of subassemblies of this system having similar structures. It can be carried out automatically by analysis of the system according to predetermined criteria or by an operative.

In a subsequent step (step 140), a generic critical event chart is modelled and failure message codes are assigned thereto, as described with reference to steps 100 and 105 of FIG. 1. As represented by the arrow shown in a broken line, this step of modelling code assignment charts is carried out for each identified similarity, i.e. for each group of subassemblies having similar structures.

The generic charts thus modelled are then analyzed (step 505) in order to identify, for each generic node, the parameter(s) which, in the name of the node in question, change from one similarity to another.

Thus, for example, assuming that a node of a generic chart has the name "Loss of the automatic door locking signal sent by the calculator of the door [x]" and that there are ten similar doors in the aircraft, named P1 to P10, the parameter in the name of this node being [x], it takes on the values of instantiations P1 to P10.

Then, for each generic chart, a table of instances of parameters is created according to the values of the parameters of the chart in the corresponding subassemblies (step 510). Such a table comprises for example the names of the generic parameters in the chart in question and, for each subset of the group in question, the value of the parameters.

A table of instances of parameters is given as an appendix by way of illustration (Table 1). Each line represents here a parameter of a given generic model. The first column contains the name of the parameter and the subsequent columns contain the possible values of this parameter for each instantiation, i.e. for each subset represented by the generic chart. By way of illustration, the table of instances of parameters comprises here the parameters #Param1#, #Param2#, #Param3# and #Generic_candidate_item#, each being capable of instantiation according to three values. This table derives from the chart pattern shown in FIG. 6a and from a description of the system to be modelled (not shown).

Turning again to FIG. 5, the generic charts are then instantiated according to all the possible instantiations in order to generate the corresponding critical event charts (step 515).

Figure 6A:
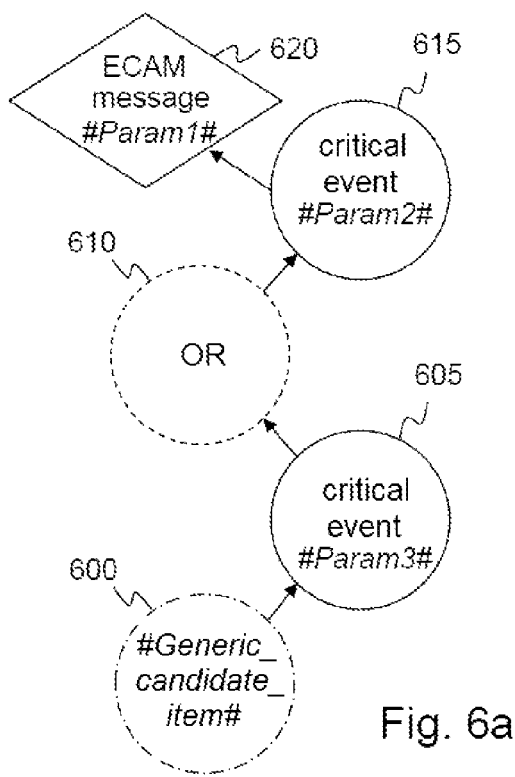
FIGS. 6a and 6b, shows an example of generation of a critical event chart on the basis of a generic critical event subchart.

By way of illustration, the generic chart shown in FIG. 6a is considered here, obtained from a modelling system as described with reference to FIG. 5 as well as the table of instances of parameters also obtained from this system by analysis of the generic chart shown in FIG. 6a.

As in FIGS. 2, 3 and 4, the circles here represent the nodes of the critical event chart while the arrows represent the arcs of the chart. Circles 605 and 615, in solid lines, represent critical event type nodes, the circles 610, in broken lines, represents a logic gate type nodes and circle 600 in dash-dotted lines represents a node of the candidate items type.

The diamond 620 corresponds to a maintenance message of ECAM type the purpose of which is to avoid the occurrence of a critical event.

A fault in the generic equipment represented by the reference 600 is capable of triggering the generic critical event represented by the reference 605 which itself is capable of triggering the generic critical event represented by the reference 615, the latter being able to be triggered by another cause. The occurrence of the generic critical event represented by the reference 615 triggers the generic maintenance message represented by the reference 620.

The generic parameters involved in the generic chart shown in FIG. 6a are defined in Table 1 of the appendix. As described previously, the latter comprises here four columns, one of which contains the names of the parameters, each parameter being capable of comprising three values. By way of illustration, the parameter #Param3# can adopt the values E11, E12 and E13, according to the first, second and third instantiation, respectively. Still by way of illustration, the first instantiation involves the values EM1, E10, E11 and LRU L1 for the parameters #Param1#, #Param2#, #Param3# and #Generic_candidate_item1#, respectively.

Figure 6B:
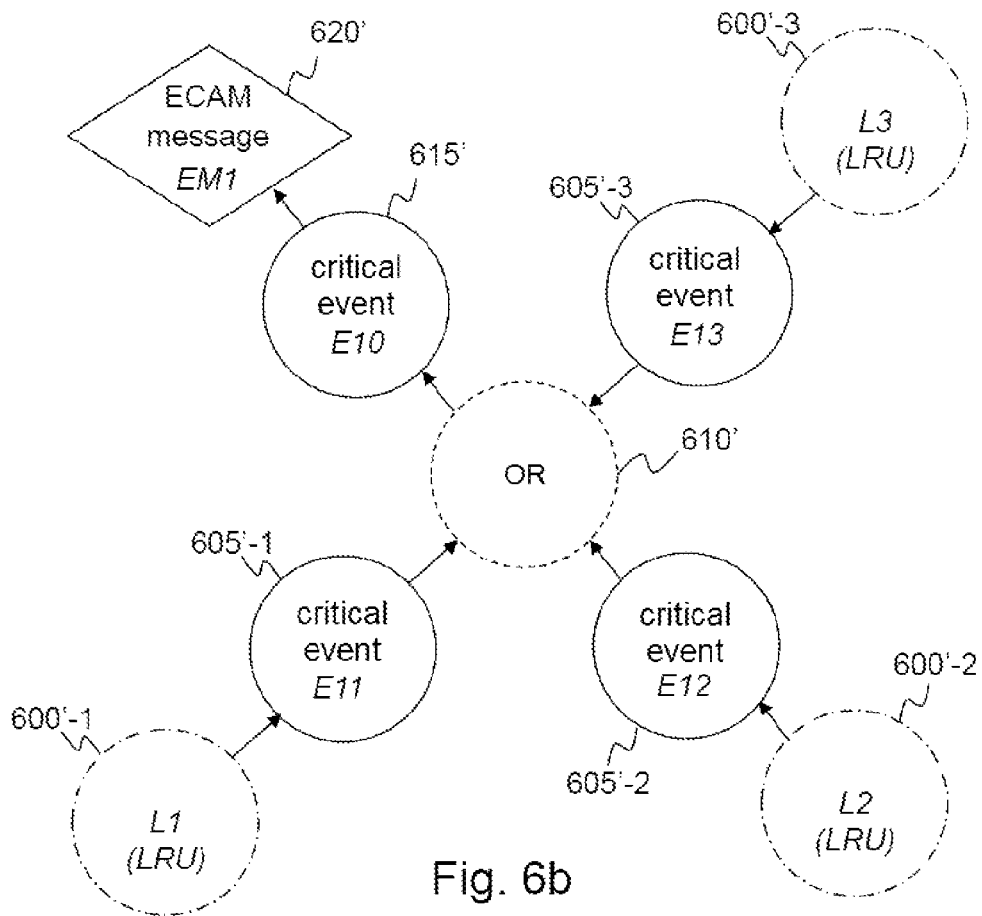

The instantiation of the generic chart shown in FIG. 6a with the instantiation values defined in Table 1 of the appendix makes it possible to generate the critical event chart shown in FIG. 6b.

Because of the values defined in the table of instances of parameters, the critical event chart comprises three specific branches pertaining to each instance (referenced 600'-i and 605'-i where i represents the instantiation number varying from 1 to 3) and a common branch (referenced 610', 615' and 620').

The advantages achieved by the steps described with reference to FIG. 5 compared with those described with reference to FIG. 1, considered singly, are in particular the following:

reduction of the workload for analysis and preparation of the critical event chart by a factor linked to the number of similarities present in the system to be modelled. Thus, for example, when considering an A380 type aircraft (A380 is a trade mark), comprising five similar main deck doors, the modelling work is divided by a factor of the order of five for generating the critical event chart of the door management subsystem;

facilitated validation of the critical event charts linked to the fact that the possible instances are represented in the form of tables giving the opportunity of validating the consistency of the data column by column;

improving the uniformity and quality of the final critical event chart due to the fact that only the variable parameters change. Moreover, such an algorithm makes it possible to apply rules for naming nodes of the critical event charts, reducing the possible errors and making them easier to read; and possibilities for storing generic chart patterns in professional databases which can be used for modelling different types of similar aircraft. This approach allows knowledge transfer between aircraft models and non-regression (the lessons learned on chart patterns of previous-generation aircraft are acquired for new generation aircraft).

Turning again to FIG. 1, when the critical event chart has been established and the relationships between the messages linked to events detected in monitoring systems and nodes of the critical event chart of the critical events type have been established, real-time or deferred messages linked to events detected in monitoring systems can be obtained (phase 110), for processing. These messages can in particular be obtained on board an aircraft via a centralized maintenance system (CMS) or on the ground by collecting messages regularly transmitted by the aircraft, for example messages of the aircraft communication addressing and reporting system (ACARS) type.

This phase of obtaining messages and items of information has the further purpose of determining a minimum list of parameters used in the logical expressions used in the critical event chart, in particular ACMS parameters, to make it possible to carry out given diagnostic operations and to access the values of these parameters to allow these logical expressions to be evaluated.

A subsequent phase (phase 115) consists in particular of using the critical event chart (static and a priori knowledge), identified parameter values and notifications of the monitoring systems (dynamic knowledge collected in real time) in order to produce a diagnostic aid for the system corresponding to the critical event chart at a given moment.

To this end, the critical event chart makes it possible to establish causality links between critical events the corresponding notifications of which have been received and to isolate the critical events at the source of the propagation of the others. This chart moreover makes it possible to deduce therefrom a diagnostic aid via suspecting a minimum number of candidate items by calculating the set of the minimal vertices (or hitting sets), i.e. the sufficient set of the configurations of candidate items that could have resulted in each critical event in question.

Figure 7:
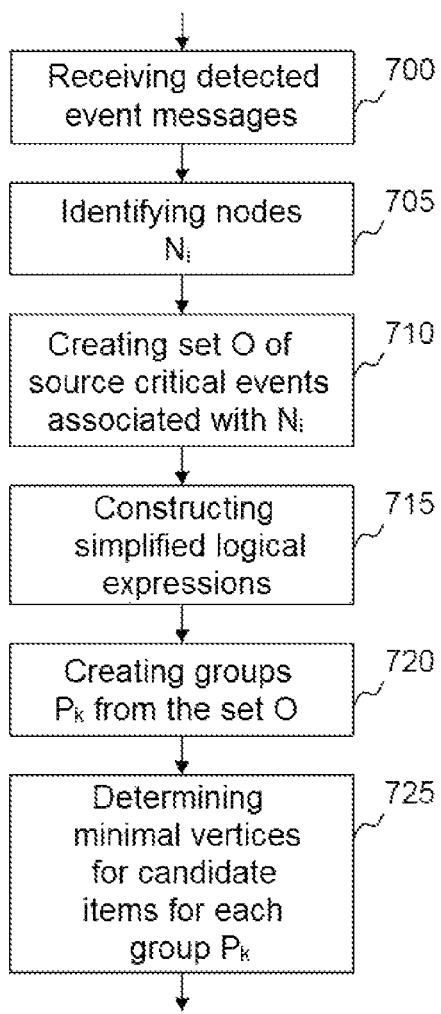
FIG. 7 shows an example of a diagnostic aid algorithm for an aircraft system based on notifications received from monitoring systems and a critical event chart.

FIG. 7 shows an example of a diagnostic aid algorithm based on notifications received from monitoring systems and a critical event chart as described previously.

After receiving at least one notification from a monitoring system (step 700), the corresponding notification type node(s) Ni are identified (step 705) in the critical event chart, according to the previously-established associations (phase 105 of FIG. 1).

In a subsequent step (step 710), the identified notification type nodes Ni of are used to run through the critical event chart and select the set O of the source critical events, i.e. critical events capable of triggering the critical events directly associated with the identified notification type nodes Ni. Each of the source critical events of the set O is such that:

there is no critical event directly linked to the identified identification type nodes Ni from which it cannot be deduced; and, the time slot for its occurrence is included in the time slots for the occurrence of the subsequent events.

In order to ensure a causality relationship between the events, a condition of inclusion between the time of occurrence of the messages associated with the identified notifications is, preferably, used when creating group O. According to this condition, O is a subset $\{E_j\}_{j \in J}$ Ni such that for any element E' included in Ni and any element Ej included in O, either E' does not imply $E_j$ ($\neg (E' \Rightarrow E_j)$), or the time slot of occurrence of Ej is not included in the time slot for the occurrence of $$E' \left\{ \begin{pmatrix} I_{E_j} \not\subset I_{E'} \\ \text{and} \\ I_{E_j} \neq I_{E'} \end{pmatrix} \right\}.$$

Figure 8A:
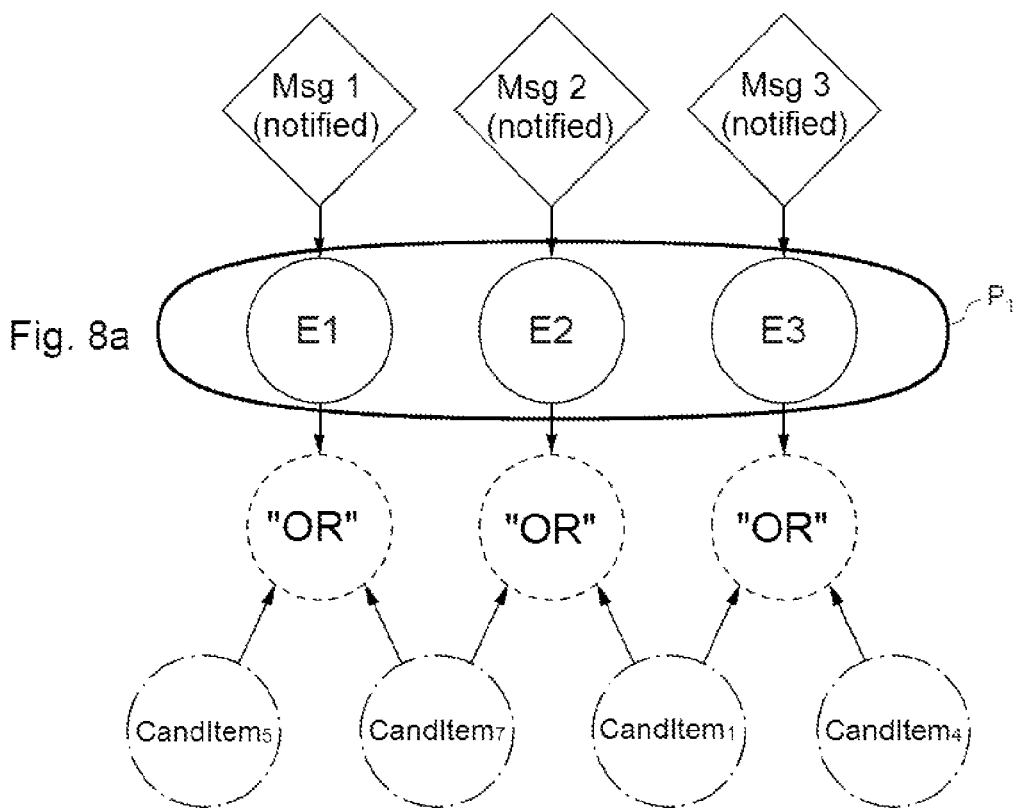
FIGS. 8a and 8b, shows certain steps of the algorithm described with reference to FIG. 7.

In a subsequent step (step 715), the algorithm runs through the subchart of the antecedent nodes of each source critical event of the set O. The algorithm runs through the subchart as far as the candidate items and, on its way, applies the logic gates of the critical event chart in order to construct the simplified logical expression formed on the basis of candidate items and of Boolean operators AND, OR or NOT. This expression constitutes the logical explanation of the source critical event in question. To this end, the logical predicate Ab(•) is introduced (Ab meaning abnormal). It represents the logical function allowing a candidate item to be suspected. Thus, for example, Ab(Actuator) means that failure of the actuator is suspected. By way of illustration and as shown in FIG. 8a, the critical event E1 is explained by the logical expression:
Ab(CandItem5) OR Ab(CandItem7)
the critical event E2 is explained by the logical expression:
Ab(CandItem7) OR Ab(CandItem1)
the critical event E3 is explained by the logical expression:
Ab(CandItem1) OR Ab(CandItem4)

In a subsequent step (step 720), the source critical events are grouped together as follows: two critical events Ei and Ek are grouped together in the same set Pj if their (previously determined) associated logical explanations contain at least one common candidate item operand.

Turning again to the previous example based on FIG. 8a, the events E1, E2 and E3 (considered as source critical events) are grouped together in the same set P1={E1, E2, E3} because the logical expressions explaining the source critical events E1 and E2 contain the same operand Ab(CandItem7) and the logical expressions explaining the source critical events E2 and E3 contain the same operand Ab(CandItem1).

Thus, two groups Pj and Pk constitute two groups of different sources and allowing different sets of suspect candidate items to be isolated: by considering the set of candidate items suspected by Pj and that of the candidate items suspected by Pk, these sets are separated. Each group Pk reflects the presence of a problem Fk the diagnostics of which will be formulated on the basis of the candidate items which can be deduced from the group.

For a group Pk, the problem Fk is the subset of critical events such that:

group Fk is included in group Pk or is equal to group Pk;
group Fk has minimal cardinality; and
any element of Pk\Fk has at least one ancestor in group Fk.
Thus, for example, if group Pk is equal to {E1, E2, E3}, by using the chart shown in FIG. 2, the problem Fk is equal to {E2, E3} because according to the chart shown in FIG. 2, E2 and E3 are ancestors of E1.

In a subsequent step (step 725), the minimal vertices (minimal hitting sets) of candidate items covering each source critical event Ei of each set Pk are calculated.

A vertex of the set Pj of candidate items covering a given critical event is here defined as a conjunction of predicates on these candidate items which is consistent with the logical expression associated with the critical event Ei.

Thus, by way of illustration with reference to FIG. 3, the logical expression Ab(Actuator) AND Ab(Supply cable), associated with the critical event "Adjustment dysfunction", is consistent with the logical expression Ab(Actuator) OR Ab(Supply cable) OR Ab (Circuit-breaker) OR Ab(Main supply bus).

A minimal vertex is here defined as follows: in a set of vertices $\{Vn\}$, a vertex $Vm \in \{Vn\}$ is called minimal if there is no other vertex of $\{Vn\}$ which can be logically deduced from Vm.

Thus, for example, the vertex Ab(Actuator) is deduced from the vertex Ab(Actuator) AND Ab(Supply cable). Consequently, the vertex Ab(Actuator) AND Ab(Supply cable) is not a minimal vertex of a set which contains these two vertices.

Figure 8B:
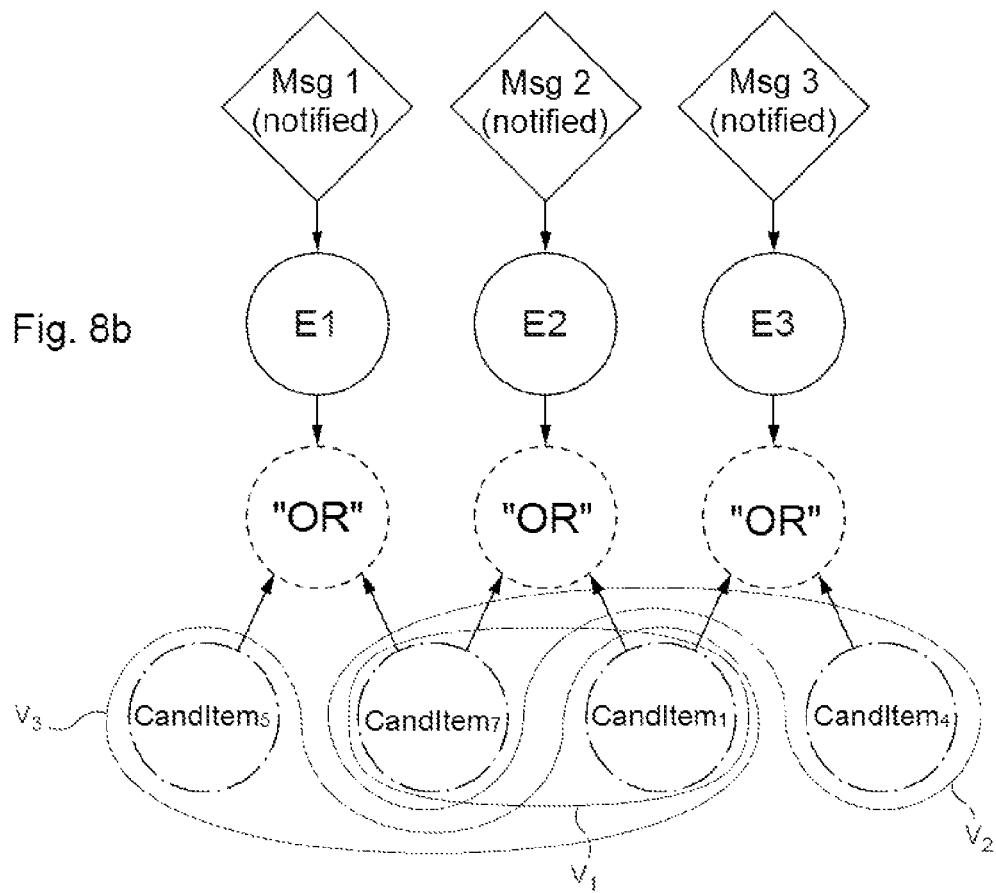

These minimal vertices represent here the minimal diagnostics for each problem Fk associated with a group Pk. In other words, the minimal vertices of a group Pk are the minimal logical expressions of candidate items capable of explaining all the critical events of group Pk. According to the example given previously with reference to FIG. 8a and shown in FIG. 8b, the minimal vertices Vr are, for group $P_1 = \{E_1, E_2, E_3\}$, the following logical expressions of the candidate items, V1: Ab(CandItem1) AND Ab(CandItem7)
V2: Ab(CandItem1) AND Ab(CandItem5)
V3: Ab(CandItem4) AND Ab(CandItem7)

By way of illustration, the vertex V4 (Ab(CandItem1) AND Ab(CandItem7) AND Ab(CandItem4)) is not a minimal vertex of group P1 because the minimal vertex V1 (Ab(CandItem1) AND Ab(CandItem7)) is deduced therefrom.

The minimal vertices of candidate items of each group Pk can then be grouped in order to represent all the candidate items allowing the explanation of all the critical events identified through the messages notifying detected events.

The use of a critical event chart in a diagnostic aid system makes it possible to increase the level of accuracy of the diagnostics by the ability to carry out crosschecking by minimal vertices (minimal hitting sets), making it possible in terms of time to optimize the troubleshooting procedures on the ground and, as a result, to reduce maintenance costs.

Furthermore, the level of completeness of the final diagnosis is increased. In fact, the diagnosis is expressed on the basis of the candidate items of the critical event chart. Due to its construction, all the known origins capable of explaining the subsequent malfunctions are covered: line-replaceable units (LRU), software, cables or operational conditions such as a reset of an item of equipment or abnormal operating conditions.

Moreover, the relationships established between a diagnosis and notified messages or warnings which can be consulted on the critical event chart can be useful during online aircraft maintenance operations at a stopover for resolving causes associated with a particular symptom (ECAM type messages, warnings, etc.) reported by the pilot in a flight logbook. By using the critical event chart, the diagnostic aid system does not find a correlation relationship between failures and symptoms but establishes causality relationships consistent with the safety analyses, which can in particular be used in enquiries, in particular in the context of accidents.

Moreover, combined with a diagnostic result, the critical event chart can be used in a troubleshooting procedure. In fact, such a procedure typically consists of testing the lower branches of the chart, linked to the candidate items, concerning which there is uncertainty with respect to failures, because the set of information notified was not sufficient to remove this uncertainty. In order to remove ambiguities, the troubleshooting procedure can rely on the chart in order to clearly define the areas of uncertainty, then refer to new types of notifications provided by ACMF parameters or avionic test results.

Turning again to FIG. 1, the minimal vertices identified during phase 115 can in particular be used for selecting troubleshooting procedures.

Thus, the step referenced 120 in FIG. 1 relates to selecting, from a troubleshooting manual (TSM), or fault isolation manual (FIM), an optimum troubleshooting procedure for each previously calculated minimal vertex. Each procedure in the troubleshooting manual tests a set of candidate items (the number of candidate items tested by a given procedure is called the procedure perimeter).

This step can be broken down into two parts.

During a first part of this step, a search is carried out in the troubleshooting manual for the references of the procedures relating to testing all the candidate items of each previously calculated minimal vertex the perimeter procedure of which is minimal. This set of procedures forms, for each minimal vertex, an optimal list of troubleshooting procedures.

A second part involves identifying the procedures which are common to several vertices.

The information thus obtained, linked to the troubleshooting procedures, is advantageously combined with the diagnostic report in order to allow an optimal and effective failure test.

It is noted here that the search for procedures in the troubleshooting manual as described above can be improved by assigning priorities to the procedures, for example according to their execution time, from the quickest to be executed to the longest, or according to their implementation, favouring those that do not require any tool over those requiring ground specific equipment (GSE).

By way of illustration, it is assumed here that the problem F1 the presence of which is reflected by group P1 is diagnosed by the minimal vertices V1=$\{L1, L2\}$ or V2=$\{L3\}$ and that the problem F2 the presence of which is reflected by group P2 is diagnosed by the minimal vertex V3=$\{L1, L4\}$. It is also assumed that the troubleshooting manual contains the following procedures:

TSM1: procedure relating to testing LRUs L1, L2 and L4
TSM2: procedure relating to testing LRUs L1 and L3
TSM3: procedure relating to testing LRU L3
TSM4: procedure relating to testing LRU L3

Consequently, the result obtained after completing step 120 of selection of procedures is the following for the problem F1 the presence of which is reflected by group P1, the minimal vertex V1 is optimally dealt with by the procedure TSM1; and the minimal vertex V2 is optimally dealt with by the procedure TSM3 or the procedure TSM4;

for the problem F2 the presence of which is reflected by group P2, the minimal vertex V3 is optimally dealt with by the procedure TSM1.

The procedure TSM1 is therefore common to the resolution of problems F1 and F2 the presence of which is reflected by groups P1 and P2. This procedure is therefore favoured over the others.

The advantages achieved by such a step of selecting the failure resolution procedures are in particular the following:

dynamic selection of the troubleshooting procedures allowing optimal adaptation to a combination of failures present in the system (the current solutions do not generally allow such a result to be obtained, as maintenance operatives must process the suspect items one by one, without being formally certain of systematically using the most direct procedure);

dynamic identification of the procedures common to the resolution of several problems, allowing several problems to be resolved by applying a minimum of procedures. Thus, the number of jobcards can be optimized by a maintenance control centre of the aircraft operating company in question, when preparing maintenance activities;

independence of the structure of the troubleshooting manual vis-à-vis the algorithm for selecting failure resolution procedures. In other words, the TSM documentation is independent of the diagnostic system. However, the TSM procedure references could be mapped on the critical event chart, as the detection means are mapped, for optimization purposes.

Turning again to FIG. 1, the minimal vertices identified during phase 115 can also be used to carry out a failure tolerance analysis and identify imminent high-level critical events.

Figure 9:
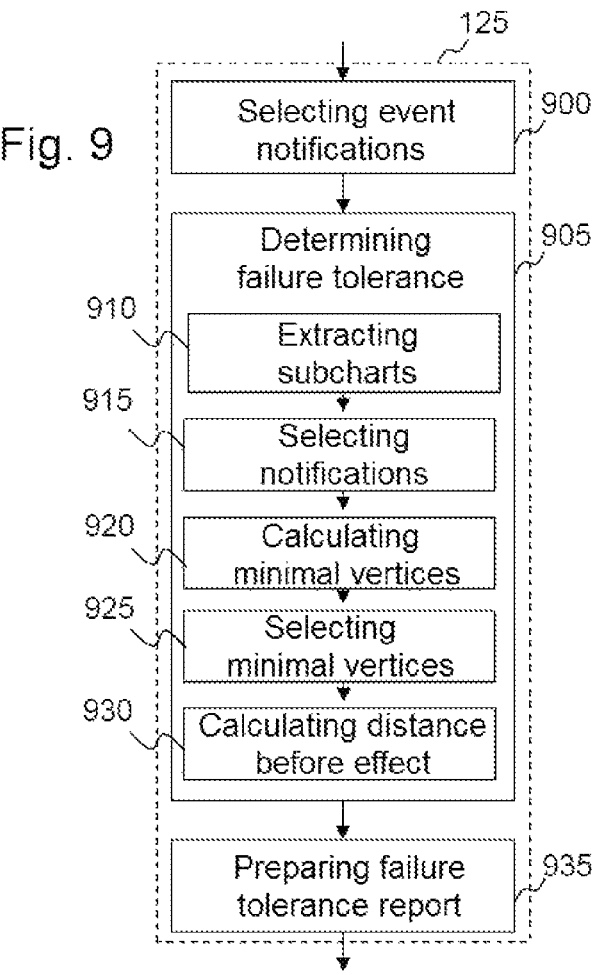
FIG. 9 shows an example of a failure tolerance analysis algorithm.

FIG. 9 shows such a failure tolerance analysis algorithm.

A first step (step 900) relates to producing a list of detections of failure notifications from the critical event chart for which a failure tolerance analysis must be carried out. In other words, step 900 involves selecting notifications of failures capable of being detected and used in the critical event chart, for which a failure tolerance analysis must be carried out. Such a list of selected detections can be predetermined, produced by an operative or produced automatically according to given criteria.

Attributes are advantageously associated with each selected detection. Such attributes comprise, for example, the following attributes:

a reference to a family associated with the detection, according to a predetermined classification, capable in particular of comprising elements such as aircraft_effect, maintenance_effect and operation_effect; and a degree of the associated operational impact, on a predetermined scale, that can in particular comprise three levels (low, average and high).

These attributes are not necessarily used during failure tolerance calculations but are helpful in deciding whether or not to undertake a preventive maintenance activity.

By way of illustration, the message ECAM EM1 in FIG. 4 can be selected during step 900 and classified in the aircraft_effect family with a high operational impact.

In a subsequent step (step 905), the determination of the failure tolerance is carried out. It involves in particular determining, for each of the selected detections, whether or not the corresponding failure tolerance has been encroached and identifying the pathways of the critical event chart which can lead to the corresponding selected detection, starting from the candidate items suspected by the diagnostics previously carried out (step 115 of FIG. 1). This analysis makes it possible in particular to identify candidate items of the critical event chart a malfunction of which would have an immediate effect with respect to the selected detections.

It is noted that the detections selected during step 900 are situated in general at the top of the critical event chart because they refer to high-level critical events. By way of illustration, such a detection can relate to an ECAM message reporting a loss of function of the aircraft to the pilot, who must apply an adapted piloting procedure as a consequence (flight crew operating manual (FCOM) procedures).

Step 905 thus involves identifying the list of previously selected detections which are such that at least one candidate item is suspected on at least one branch of the chart leading to this detection. Only these detections are advantageously investigated subsequently because these are the only ones which are impacted by the suspected failures in the aircraft. In fact, the distance which separates them from total unavailability is reduced due to the failures.

It should be noted here that in certain circumstances, for example according to the phases of the flight, warning messages are not immediately displayed in order to avoid disturbing the pilot. Consequently, failures can exist which have not been indicated to the pilot. It can therefore be useful to know preventively that a warning is imminent.

As shown in FIG. 9, the step of determination of the failure tolerance can be broken down into several steps 910 to 930.

The diagnostics carried out during step 115 of FIG. 1 makes it possible to identify, if necessary, several groups Pi reflecting the presence of problems Fi. Each of these groups is diagnosed by sets of minimal vertices of candidate items Ei able to be considered as sets of suspects.

During step 910, subcharts are extracted from the previously produced critical event chart (step 100 of FIG. 1). More specifically, for each suspect candidate item of each set of suspects Ei of each group Pi reflecting the presence of a problem Fi, the subchart generated by this candidate item and all the subsequent arcs and nodes are extracted from the critical event chart. The set of subcharts thus generated is called SG hereinafter.

In a subsequent step (step 915), the detections of notifications of events of the set SG belonging to the list of the selected detections produced in step 900 are identified. This step makes it possible to obtain a list of selected detections (for which a failure tolerance analysis must be carried out) which can be notified in the near future due to their association with suspect candidate items (due to the fact that these detections belong to the set SG). This list of detections is called hereinafter the list of imminent effects.

The minimal vertices of candidate items are then calculated for each detection Ii of the list of imminent effects (step 920). To this end, it is possible to use the method described previously with reference to FIG. 7. This step thus makes it possible to obtain a set Vi of sets of candidate items for each detection Ii of the list of imminent effects capable of expression in the following form:

$$Ii \rightarrow Vi = \{v1 = \{\text{CandItem}n\}n, v2 = \{\text{CandItem}m\}m, \ldots\}$$

where {CandItemn}n represents a set of candidate items (CandItem) defined by the set of the (not necessarily continuous) values of the index n.

The candidate items of the set Vi (set of the minimal vertices) are then selected (step 925), for each detection Ii of the list of imminent effects, so as to retain only the vertices (sets of candidate items) which comprise at least one candidate item suspected by the diagnostics carried out previously (during step 115 of FIG. 1). These vertices represent preventive diagnosis. Thus, for each detection Ii of the list of imminent effects, a subset Wi of the set Vi is obtained:

$$Ii \rightarrow Wi \subseteq Vi$$

$$Wi = \{w1 = \{\text{CandItem}o\}o, w2 = \{\text{CandItem}p\}p, \ldots\}$$

Each of the vertices wi therefore contains at least one suspect candidate item.

It is observed here that, alternatively, the selection of the vertices which comprise at least one candidate item suspected by the diagnostics previously performed can be carried out within the short-length minimal vertices, i.e. those containing a limited number of candidate items (and not among all the minimal vertices). The maximum length of the minimal vertices to be taken into account can be predetermined.

During a subsequent step, a remaining distance before imminent effect is calculated for each of the vertices wi (step 930). A remaining distance before imminent effect is calculated as being equal to the number of candidate items present in the vertex in question and not suspected during step 115 of FIG. 1. Thus, the distance di of the vertex wi can be defined as follows:

$$wi \rightarrow di = \text{Card}\{\text{CandItem}j\} \text{ such that CandItem}j \in Wi$$
and CandItem$i$ is not a suspect candidate item.

The data thus obtained are used to produce a failure tolerance report (step 935). More specifically, the failure tolerance report can in particular comprise the list of the detections Ii from the list of imminent effects with their attributes (for example the family and degree of operational impact), the preventive diagnoses relating thereto and the remaining distance before imminent effect for each of these diagnoses.

Figure 10:
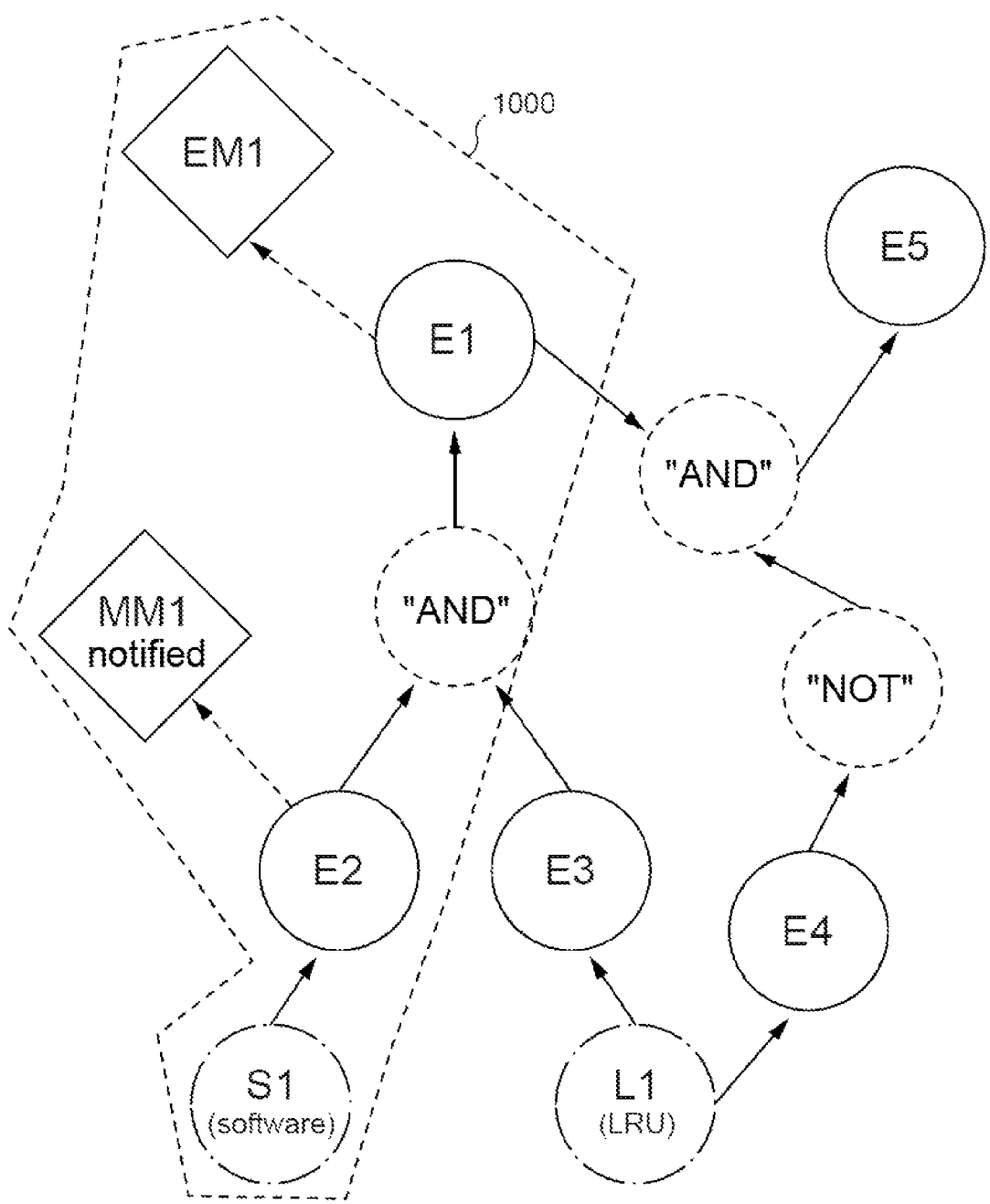
FIG. 10 shows an example of a critical event subchart obtained on the basis of the critical event chart shown in FIG. 4 when the ECAM EM1 message is selected for detection purposes, the candidate item S1 is a suspect candidate item at the outcome of a failure identification step and the MM1 message has been notified.

FIG. 10 shows an example of a subchart 1000 obtained on the basis of the critical event chart shown in FIG. 4 when the ECAM EM1 message is selected as detection (step 900 of FIG. 9), the candidate item S1 is a suspect candidate item on completion of failure identification (step 115 of FIG. 1) and the MM1 message has been notified. The algorithm described with reference to FIG. 9 makes it possible to deduce from subchart 1000 that the EM1 message is imminent and that a remaining distance before imminent effect equal to one (associated with the candidate item L1) is associated therewith.

Table 2 given in the appendix represents an example of a failure tolerance report generated by the algorithm described with reference to FIG. 9 in the light of subchart 1000.

The preparation of failure tolerance reports using the algorithm described with reference to FIG. 9 offers many advantages including:
the use of exhaustive physical knowledge of the propagation of failures in the system, that is not dependent on statistics;
indication of candidate items not yet declared failed but a malfunction of which would result in a critical event. This information is very important for decision-making. In fact, such information makes it possible to prevent an aircraft departing if the tolerance margin is due only, for example, to the life of a line-replaceable unit (LRU) that is very expensive to send to the place of destination of the aircraft. In this case, the risk of a long immobilization of the aircraft while waiting for a replacement LRU is high. On the other hand, if the tolerance margin is encroached but the logistics and maintenance of the replacement parts do not pose a problem in terms of costs and operationally, it is less risky to allow the aircraft to depart.

Turning again to FIG. 1, the minimal vertices identified during phase 115 can also be used to rank the most likely suspects and/or problems in order to facilitate preventive diagnosis operations (phase 130). Such ranking can in particular be based on a diagnostic history.

Figure 11:
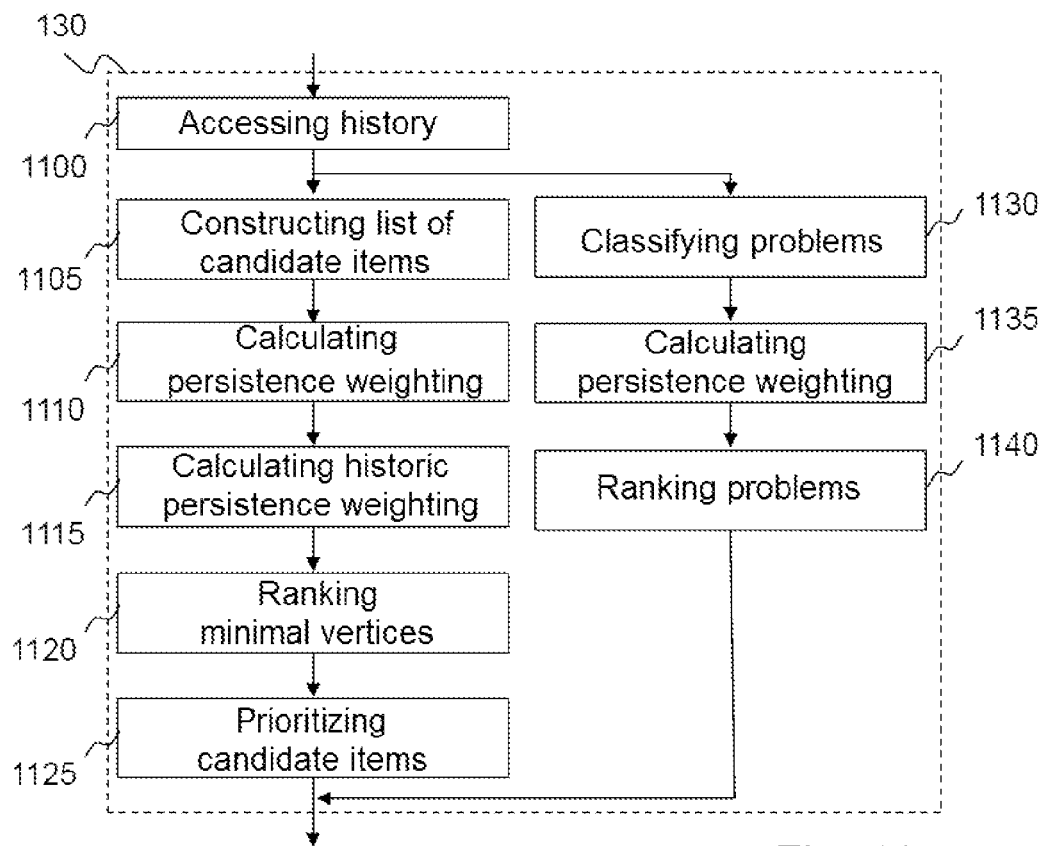
FIG. 11 shows an example of an algorithm for ranking the most likely candidates and problems, on the basis of pre-calculated minimal vertices, in order to facilitate preventive diagnosis operations.

FIG. 11 shows an example of an algorithm for ranking the most likely suspects and problems, on the basis of pre-calculated minimal vertices, in order to facilitate preventive diagnosis operations;

As shown, a first step (step 1100) relates to accessing a diagnostic history, typically a diagnostic history of the n previous flights, for example of the four previous flights (n=4) or of the fifteen previous flights (n=15).

Lists of candidate items belonging to the sets of previously identified suspect candidate items (set Ei) are then produced (step 1105).

According to a particular embodiment, several lists of suspect candidate items are produced as a function of the cardinality of the sets of suspect candidate items Ei. More specifically, a list LSr,s is constructed for each cardinality r of the sets Ei (r varying from 1 to p) and each preceding flight s (s varying from 1 to n). The maximum value p of the cardinalities of all the sets Ei to be taken into account is preferably predetermined, for example p=4. In other words, p sets {LSr, s}r=1 . . . p are defined for each flight s.

During a subsequent step (step 1110), diagnostic persistence weightings are calculated for each of the flights of the history, for each suspect candidate item in the current flight.

According to a particular embodiment, the diagnostic persistence weightings are calculated as follows:
only the diagnostic persistence weightings of the suspect candidate items in the current flight are calculated. The suspect candidate items in the previous flights but not in the current flight are disregarded in this calculation;
if a candidate item CandItem is suspected in a flight s its diagnostic persistence weighting is zero (PCandItem,s=0), for this flight, if it is no longer suspected in the subsequent flight (s−1); and
if a candidate item is suspected in a flight s and is still suspected in the subsequent flight (s−1), its diagnostic persistence weighting PCandItem,s, for this flight (s), is defined as being the diagnostic persistence weighting of this candidate item PCandItem,s−1 in the subsequent flight (s−1) incremented by a value linked to the length of time since the flight (s) and to the cardinality (r) of the set LSr,s to which the candidate item belongs or zero if the suspect candidate item does not belong to any LSr,s set. The diagnostic persistence weighting of this candidate item on the subsequent flight (s) can then be defined by the following relationship, $$P_{CandItem,s} = \begin{cases} P_{CandItem,s-1} + \dfrac{1}{i \times f(s)} & \text{if } CandItem \in LS_{r,s} \\ P_{CandItem,s-1} & \text{if } CandItem \notin LS_{r,s} \end{cases}$$

where f(s) is an increasing function of s allowing the weighting of the old flights to be reduced in order to limit the influence of old diagnostics for which maintenance operations may have been carried out. By way of illustration, the function f(s) can be defined as follows:

$$f(s)=s=s$$

Table 3 in the appendix gives an example of a list of suspect candidate items and associated diagnostic persistence weightings. Each line represents here a flight identified by the value of the index given in the first column. The second column states problem(s) identified during the corresponding flight. For example, the problem FE,4 was identified during the current flight (flight s=1). The third column gives the minimal vertices obtained in response to step 115 of FIG. 1 for the corresponding flight. Thus, for example, on completion of flight s=2, i.e. of the flight preceding the current flight, the minimal vertices were {S1}, {L2, L3} and {L4}. The fourth column of the table indicates the cardinality(ies) of the minimal vertices and the fifth column gives the content of the lists LSr,s constructed on the basis of the minimal vertices according to their cardinality. The sixth column comprises, for each flight, the list of the suspect candidate items in the current flight and the seventh column indicates the diagnostic persistence weightings associated with these candidate items according to the calculation described previously. By way of illustration, the diagnostic persistence weightings associated with the candidate item S1, for the flight s=3, is calculated as follows:

$$P_{S1,3} = P_{S1,3-1} + \frac{1}{1 \times 3} = 1.5 + 0.33 = 1.83$$

where i=1, f(s)=s=3.

In a next step (step 1115), diagnostic historic persistence weightings are calculated for each suspect candidate item in the current flight. The diagnostic historic persistence weighting of a suspect candidate item, called PHCandItem is the maximum value of the persistence weighting obtained by this candidate item over all of the flights. Such a weighting can be defined by the following relationship:

$$PH_{CandItem} = \max_s(P_{CandItem,s})$$

By way of illustration and reverting to the example given with reference to

Table 3 of the appendix, the candidate item S1 has a historic persistence weighting equal to 2.08 which represents the maximum value of the diagnostic persistence weightings of this item which develops from 1 to 1.5 to 1.83 to 2.08 for flights s=1, 2, 3 and 4, respectively. Similarly, the candidate item L2 has a historic persistence weighting equal to 1.58 and the candidate item L5 has a historic persistence weighting equal to 1.

In a subsequent step (step 1120), the historic persistence weightings are used to rank the minimal vertices in the diagnostics of the same problem, from most relevant to least relevant. To this end, rules can be used, in particular the following rules:

when two minimal vertices have different cardinalities, it is considered that the vertex with the smallest cardinality is the most relevant;

when two minimal vertices have equal cardinalities, it is considered that the most relevant is the one in respect of which the sum of the historic persistence weightings of the candidate items of which it is constituted is the greatest; and when two minimal vertices have equal cardinalities and the sums of the historic persistence weightings of the candidate items of which they are constituted are equal, characteristics of the candidate items such as their type and nature (hardware, software, wiring, inhibition mode, etc.) can be used in order to compare the minimal vertices. Thus, by way of illustration, it is considered that hardware candidate items are more relevant than software candidate items which are themselves more relevant than candidate items of the wiring type. Finally, if equality persists, other criteria such as alphabetical order can be used.

Such a step makes it possible to obtain a diagnosis classified by relevance.

By way of illustration and reverting to the example given with reference to Table 3 in the appendix, three minimal vertices ({S1}, {L5}, {L2}) were identified for the current flight. These three minimal vertices have the same cardinality (1). Nevertheless, by using the sum of the historic persistence weighting of each candidate item of each minimal vertex (2.08, 1.58 and 1, respectively), it is possible to classify them: {S1}, {L2}, {L5}.

The historic persistence weightings can also be used in order to prioritize the suspect candidate items absolutely, for example by using the following rules:

for two given candidate items, it is the candidate item involved in a minimal vertex of the smallest cardinality and with the greatest historic persistence weighting which has the highest priority;

for two candidate items involved in vertices of the same cardinality, it is the candidate item involved in the most relevant vertex which has the highest priority;

for two candidate items involved in vertices of the same cardinality having the same relevance, characteristics of the candidate items such as their type and nature (hardware, software, wiring, inhibition mode, etc.) can be used in order to compare these candidate items. Thus, by way of illustration, it is considered that hardware candidate items are more relevant than software candidate items which are themselves more relevant than wiring-type candidate items. Finally, if equality persists, other criteria such as alphabetical order can be used.

By way of illustration, it is assumed that a diagnosis of the present condition comprises the following minimal vertices, {L1, L2} or {L3} or {L4, L5} involving the following candidate items the historic persistence weightings of which have been calculated and are given in parentheses:

L1 (3), L2 (2), L3 (1), L4 (1), L5 (2)

The use of the rules given previously makes it possible, on the basis of the cardinalities of the minimal vertices and of the historic relevance weightings, to prioritize the candidate items in the following order:

1. L3
2. L1
3. L2
4. L5
5. L4

This prioritization results from the fact that the candidate item L3 is involved in a vertex with a cardinality of one while all the other candidate items are involved in vertices with a cardinality greater than one. Moreover, in vertices with a cardinality of two, vertex {L1, L2} is more relevant than vertex {L4, L5} due to the sum of the corresponding historic persistence weightings (candidate items L1 and L2 are therefore more important than candidate items L4 and L5). Finally, candidate item L1 has a greater historic persistence weighting than that of candidate item L2 and candidate item L5 has a greater historic persistence weighting than that of candidate item L4.

The diagnostic history of the n previous flights and the critical event chart can be used to rank diagnostic problems relating to a given flight.

To this end, a first step (step 1130) consists of identifying the possible order of the problems Fi diagnosed flight after flight by using an order relationship such as the following: a problem Fi diagnosed on a flight prior to the present flight totally covers a problem Fj diagnosed on the present flight only if all the minimal vertices diagnosing the problem Fi are included in the list of minimal vertices diagnosing the problem Fj or minimizing the latter. By way of illustration, it is recalled that group {A} minimizes group {A, B} and that group {A} is included in the set of groups {{A}, {C, D}, {E, F}}. Such a relationship is denoted Fi→Fj.

In a subsequent step (step 1135), persistence weightings of the problems diagnosed during the current flight are calculated. Such a calculation can in particular be carried out according to the following steps:

finding the maximum problem length sequence F0, F-1, ..., F-k diagnosed on consecutive flights such that F0 is detected on the current flight, F-1 is detected on the previous flight and so on as far as the problem F-k (diagnosed during the kth flight prior to the current flight) where k>0 and $$F\text{-}k \to F\text{-}(k-1) \to \ldots \to F\text{-}1 \to F0$$

if such a sequence exists, the persistence weighting of the problem F0 is equal to k and, if it does not exist, the persistence weighting of the problem F0 is equal to zero.

The problems Fi diagnosed during the current flight are then ranked by priority according to their persistence weighting, from the greatest to the smallest (step 1140) such that a problem having a persistence weighting greater than that of another problem takes priority over the latter.

In the case of equality between two problems, the composition of their respective diagnostics is advantageously used for separating them. To this end, the ranks of the minimal vertices diagnosing each problem are calculated. The rank of a minimal vertex is here equal to the number of candidate items of which it is constituted. By way of illustration, the minimal vertex {CandItemA, CandItemB} is ranked two while the minimal vertex {CandItemC, CandItemD, CandItemE} is ranked three. The problems are then classified by using the ranks of the minimal vertices such that a problem diagnosed by vertices having a lower rank takes priority over a problem diagnosed by vertices of higher rank. Thus, for example, if F1 and F2 are problems having the same persistence weighting, the problem F1, diagnosed by the minimal vertices {CandItemA} and {CandItemB, CandItemC}, takes priority with respect to the problem F2 diagnosed by the minimal vertex {CandItemD, CandItemE}. In the case of equality, the problems can be separated as a function of the number of minimal vertices, the one having fewest having the greatest priority.

Figure 12:
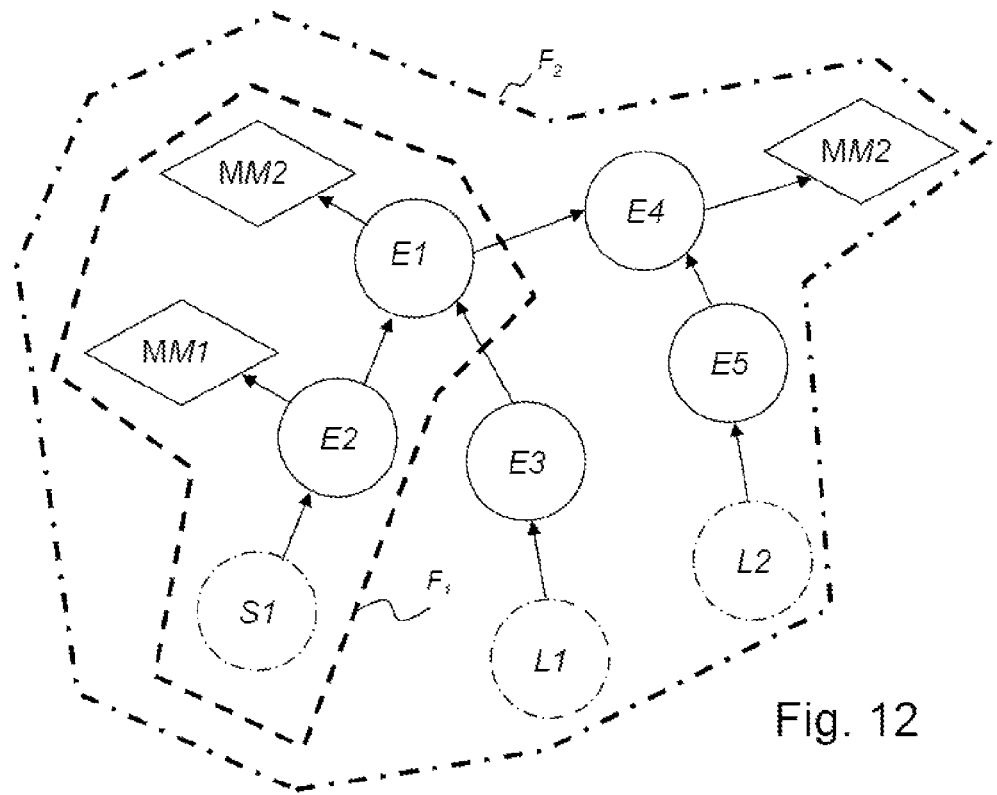
FIG. 12 shows an example of a critical event chart showing a coverage relationship between two problems.

FIG. 12 shows an example of a critical event chart showing a cover relationship between two problems.

It is assumed here that the MM1 and MM2 messages were notified during the previous flight and that the MM3 message was notified during the current flight. The problem F1 is diagnosed during the previous flight by the minimal vertex {S1}. The problem F2 is diagnosed during the current flight by the minimal vertices {S1}, {L1}, {L2}.

The problem F1 totally covers the problem F2 (F1→F2). The problem F1 therefore takes priority over the problem F2.

The steps described with reference to FIG. 11 offer in particular the following advantages:

promoting maintenance of the more often suspected candidate items, which avoids leaving an item in unresolved failure for too long. This is particularly useful in the case of operation of an aircraft that does not return to its main base after a series of flights and on which different maintenance teams work. In fact, in this case, the maintenance operatives are not the same staff from one airport to another, only making a spot check on the aircraft in a given airport. The results obtained using the steps described previously make it possible to benefit from the history of previous diagnoses; and facilitating decision-making on the ground, for example by the maintenance control centre of the aircraft operating company because the diagnosis result is already classified as a function of the history, avoiding the need for the staff of this centre to carry out the work manually from flight to flight.

Finally, reverting to FIG. 1, a full diagnostic report is produced in the course of a step 135 during which the items of diagnostic information and failure tolerance assessment are aggregated in a ranked fashion, per problem, from the highest to the lowest priority, and, for each problem, per vertex, from the most relevant to the least relevant. The report contains moreover, preferably, the list of the suspect candidate items in their order of absolute priority.

According to a particular embodiment, the diagnostic aid system is implemented in an on-board maintenance system of an aircraft. The notifications received by the diagnostic aid system are, preferably, failure reports of the ARINC 624 type sent by the systems of the aircraft, message notifications of the ECAM type, availability messages and/or warnings transmitted by the FWS. The algorithm described with reference to FIG. 7 is then executed periodically or on receiving a new notification. The critical event chart used corresponds preferably to the concatenation of the critical event charts of the aircraft systems according to its effective configuration while taking account, in particular, of the optional equipment installed.

The version of the critical event chart on board an aircraft can be a simplified version without certain branches, which nevertheless makes it possible to obtain a first diagnostic result and thus to optimize the operation and maintenance procedures. A full version of the critical event chart can be used in a second embodiment, to make it possible for example for an aircraft manufacturer to sell a detailed operational and diagnostic service to an airline.

The diagnostic aid results are advantageously stored on board the aircraft. They can then be displayed via a human-machine interface. They can also be sent to a data processing system on the ground via a communication system (for example the ACARS system).

Figure 13:
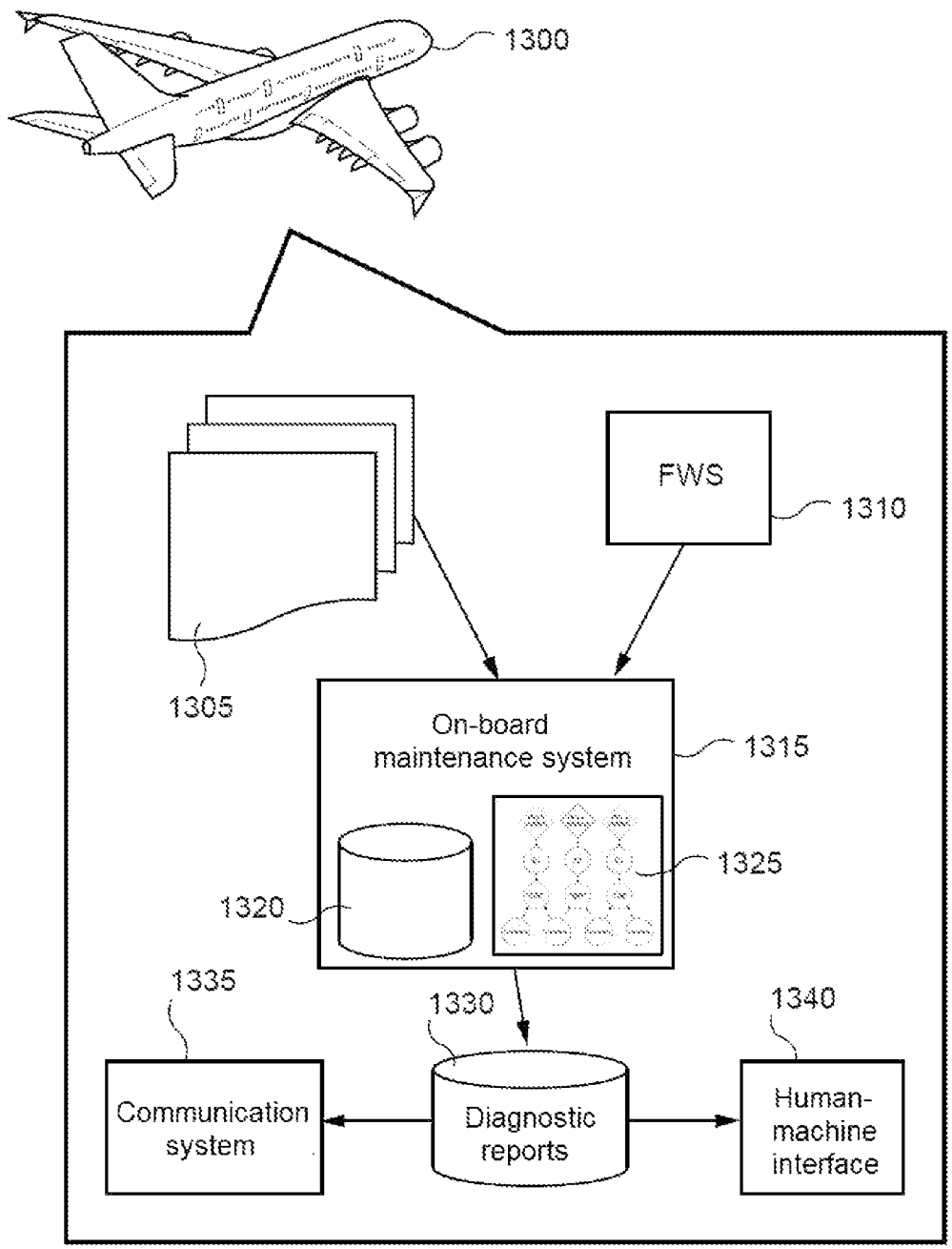
FIGS. 13 and 14 show two embodiments of the invention.

FIG. 13 shows such an embodiment implemented in an aircraft 1300 comprising a set of systems, generically referenced 1305, each provided with a BITE type monitoring system and an FWS warning system 1310. The monitoring systems as well as the warning system transmit messages notifying detected events to an on-board maintenance system 1315. The on-board maintenance system 1315 comprises a knowledge base 1320 comprising in particular at least one critical event chart 1325 associated with a system of the aircraft. This critical event chart is used in combination with the notification messages received in order to produce a diagnostic aid according to the invention by using, for example, the algorithms described with reference to FIGS. 7, 9 and 11. The result of such a diagnostic aid, comprising in particular a set of minimal vertices representing minimal diagnostics as well as failure tolerance analysis results and preventive diagnoses, is stored in report form in a database 1330 for transmission, via means of communication 1335, for example an ACARS system, to a data processing system on the ground (not shown) and/or to be consulted via a human-machine interface 1335.

Such a system allows a low latency between the notifications of the monitored systems and the execution of the diagnostic aid algorithm. Moreover, the availability, in real time, of the diagnostic aid results on board the aircraft gives it diagnostic autonomy.

According to another embodiment, the diagnostic aid algorithm is produced by a data processing system on the ground on the basis of data transmitted by an aircraft. The diagnostic aid algorithm can be executed by the aircraft manufacturer, who preferably centralizes and validates the diagnostic aid results of several aircraft, these results being capable of validation by experts. The results, comprising a set of minimal vertices representing minimal diagnostics, can then be transmitted to the airlines operating the aircraft via a communication network such as the Internet. Alternatively or in addition, the diagnostic aid algorithm can be implemented within an airline operating the aircraft, the aircraft manufacturer being able to supply the diagnostic aid algorithm in the form of software applications. The latter can be produced with an open, modular interface architecture, allowing their integration with other aircraft fleet management services.

Figure 14:
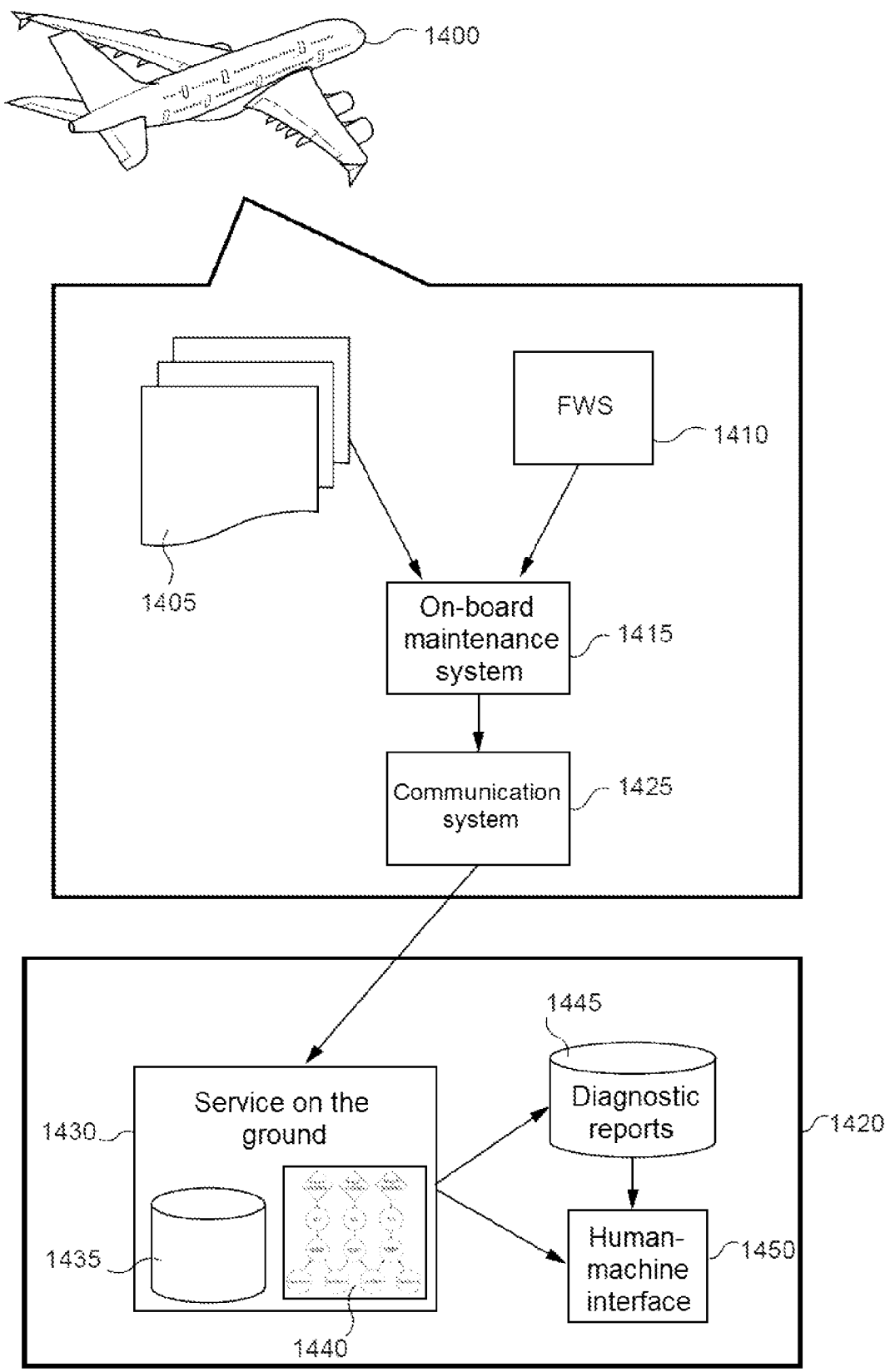

FIG. 14 shows such an embodiment implemented for data originating from an aircraft 1400 comprising a set of systems, generically referenced 1405, each provided with a monitoring system of the BITE type and an FWS warning system 1410. The monitoring systems as well as the warning system transmit messages notifying detected events to an on-board maintenance system 1415. The on-board maintenance system 1415 can transmit notification messages received from monitoring systems 1405 and warning system 1410, processed or not, combined or not, to a data processing system 1420 on the ground, via means of communication 1425, for example an ACARS system.

The data processing system 1420 comprises a knowledge base 1430 comprising in particular at least one critical event chart 1435 associated with a system of the aircraft in question. This critical event chart is used in combination with the notification messages received in order to establish a diagnostic aid according to the invention using, for example, the algorithms described with reference to FIGS. 7, 9 and 11. A result of such a diagnostic aid, comprising a set of minimal vertices representing minimal diagnostics as well as failure tolerance analysis results and preventive diagnoses, is stored in report form in a database 1445. It can be consulted via a human-machine interface 1450 after it has been produced or after it has been stored.

Such an embodiment makes it possible to use a centralized diagnostic aid system on the ground that can be used for establishing a diagnostic aid for several aircraft. Moreover, the diagnostic aid system can be incorporated, for example, into another maintenance information system the purpose of which is to schedule maintenance tasks and manage spares logistics. The use of such embodiment makes it possible to reduce considerably the time necessary for establishing a diagnosis. Thus, it has been observed that, combined with a trouble-shooting procedure, the gain in time can reach a factor of 50.

It is observed here that the previously-described method can also be used in post-processing of reports produced in real time, generally called current flight reports (CFR) automatically sent by an aircraft when in flight.

This method makes it possible to provide a preventive diagnostic aid on board the aircraft which allows experts on the ground to recommend preventive maintenance operations in order to avoid imminent effects that are very prejudicial to its operation.

By way of illustration, this method makes it possible to warn of imminent inhibition of the passenger cabin pressurization system owing to the non-confirmation of the closed & latched & locked status of one or more doors. This inhibition of the pressurization of the aircraft, if not prevented, poses a severe problem for the company, because it prevents take-off and the pilots are alerted of it at the embarkation door, when all the passengers are on board. By being informed in advance, the company can schedule the maintenance operations on the doors well in advance, and finally avoid any inhibition of cabin pressurization.

Figure 15:
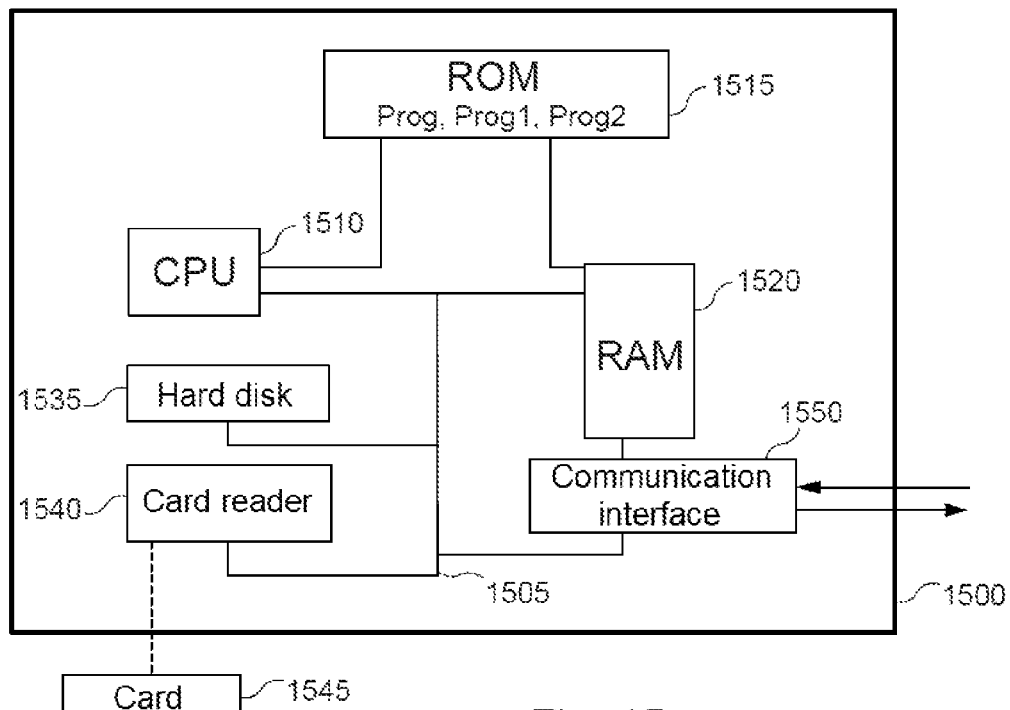
FIG. 15 shows an example of hardware architecture capable of implementing certain steps of the invention.

FIG. 15 shows an example of the hardware architecture of a device 1500 capable of implementing certain steps of the invention, in particular the steps described with reference to FIGS. 7, 9 and 11. The device 1500 is, for example, a calculator or a computer. It contains here a communication bus 1505 to which are connected:

one or more central processor units (CPU) or microprocessors 1510;
fixed storage 1515 (read only memory (ROM)) which can contain programs (prog, prog1 and prog2) necessary for implementing the invention;
random storage or cache memory 1520 (random access memory (RAM)) comprising registers capable of recording variables and parameters created and modified during the execution of the abovementioned programs; and
a communication interface 1550 suitable for transmitting and receiving data.

The device 1500 also preferably has a hard disk 1535 capable of containing the abovementioned programs as well as items of information already processed or to be processed according to the invention and a memory card reader 1540 suitable for receiving a memory card 1545 and reading from or writing to it data already processed or to be processed according to the invention.

The communication bus allows the communication and interoperability between the different elements included in the device 1500 or associated therewith. The representation of the bus is non-limitative and, in particular, the central unit is capable of communicating instructions to any element of the devices 1500 directly or via another element of the device 1500.

The executable code of each program allowing the programmable devices to implement the procedure according to the invention can be stored, for example, on the hard disk 1535 or in the fixed storage 1515.

According to a variant, the memory card 1545 can contain items of information, in particular items of information to be processed according to the invention, as well as the executable code of the abovementioned programs which, once read by the device 1500, is stored on the hard disk 1535.

According to another variant, the executable code of the programs and the items of information to be processed according to the invention can be received, at least partially, via the interface 1550, to be stored in an identical manner to that described previously.

More generally, the program(s) as well as the items of information to be processed according to the invention can be loaded into one of the storage means of the device 1500 before being executed.

The central processor unit 1510 will control and manage the execution of the instructions or portions of software code of the program(s) according to the invention, instructions which are stored on the hard disk 1535 or in the read only memory 1515 or in the other abovementioned storage elements. When powered up, the program(s) which are stored in a non-volatile memory, for example the hard disk 1535 or the read only memory 1515, are transferred to the random access memory 1520 which then contains the executable code of the program(s) according to the invention, as well as the registers for storing the variables and parameters necessary for implementation of the invention.

Naturally, in order to satisfy specific requirements, a person of ordinary skill in the field of the invention can apply modifications to the above description.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

APPENDIX

TABLE 1

Example of a table of instances of parameters

| Generic parameter name | 1st instantiation value | 2nd instantiation value | 3rd instantiation value |
|---|---|---|---|
| #Param1# | EM1 | EM1 | EM1 |
| #Param2# | E10 | E10 | E10 |
| #Param3# | E11 | E12 | E13 |
| #Generic_candidate_item1# | LRU L1 | LRU L2 | LRU L3 |

TABLE 2

Failure tolerance report
Failure tolerance report

| Imminent effect: | EM1 aircraft_effect, high_impact Preventive diagnosis at distance 1 with the suspect S1 S1 AND L1 |
|---|---|

TABLE 3

List of suspect candidate items and diagnostic persistence weighting

| Flight No. | Diagnostics | | Card | | Persistence weighting | |
|---|---|---|---|---|---|---|
| (s) | problem | min. vertex. | (r) | $LS_{r,s}$ | CandItem | cum. weighting. |
| 1 (current flight) | $F_{E,4}$ | {S1}, {L5}, {L2} | 1 | $LS_{1,1}$ = {S1, L2, L5} | S1 L2 L5 | 1 1 1 |
| 2 | $F_{D,3}$ | {S1}, {L2, L3}, {L4} | 1, 2 | $LS_{1,2}$ = {S1, L4} $LS_{2,2}$ = {L2, L3} | S1 L2 | 1.5 = 1 + 0.5 1.25 = 1 + 0.25 |
| 3 | $F_{C,2}$ | {S1}, {L2}, {L3} | 1 | $LS_{1,3}$ = {S1, L2, L3} | S1 L2 | 1.83 = 1.5 + 0.33 1.58 = 1.25 + 0.33 |
| 4 | $F_{A,1}$ $F_{B,1}$ | {S1} {L4} | 1 | $LS_{1,4}$ = {S1, L4} | S1 | 2.08 = 1.83 + 0.25 |

The invention claimed is:

1. A method for a computer-aided preparation of a diagnostic report for a system of an aircraft comprising a plurality of subsystems, at least one subsystem of said plurality of subsystems comprising a subsystem having a computer processor and performing monitoring and notification of at least one detected event, the method comprising:
   implementing, via the computer processor, a critical event chart substantially modelling said system, said critical event chart comprising a plurality of nodes, each node of said plurality of nodes being linked by a logical implication relation to at least one other node of said plurality of nodes, said plurality of nodes comprising:
      a plurality of nodes each representing a notification message capable of being received;
      at least one node representing a critical event; and,
      a plurality of nodes each representing an element of said system, which is liable to failure, and each such element comprising a suspect candidate item;
   receiving, via the computer processor, at least one notification message of the occurrence of said at least one detected event, said detected event comprising said at least one node representing said critical event;
   creating, via the computer processor, a minimal diagnostic set relative to said at least one detected event, comprising a plurality of said elements each represented by a node of said critical event chart, each element of said minimal diagnostic set being determined according to at least one logical implication relation of said critical event chart with said node representing said critical event associated with said at least one received notification message; and
   ranking, via the computer processor, at least one of said elements of said minimal diagnostic set, said ranked elements forming part of said diagnostic report;
   calculating, via the computer processor, a historic persistence weighting for each suspect candidate item in a current flight;
   performing, via the computer processor, prioritization of at least one of minimal hitting sets of suspect candidate items based on said historic persistence weighting for establishing a diagnosis relating to the current flight, each hitting set comprising some nodes, and at least one of said hitting sets being minimal when no other hitting set is included in it, said prioritization being determined based on a cardinality of said at least one of said minimal hitting sets and a relevance score being calculated by a sum of corresponding historic persistence weightings of said each suspect candidate item in said minimal hitting set; and
   displaying diagnostic results of said diagnostic report via a human-machine interface.

2. The method according to claim 1, further comprising a step of obtaining data representative of a diagnostic history of said complex system, said ranking step being substantially based on said data representative of said diagnostic history.

3. The method according to claim 1, wherein said step of ranking at least one of the elements of said minimal diagnostic set comprises a step of ranking at least one of minimal diagnostics.

4. The method according to claim 3, wherein said historic persistence weighting is calculated for each element of a plurality of elements of said minimal diagnostic set, said historic persistence weighting calculation being based on the presence of each element of said plurality of elements of said minimal diagnostic set in a minimal diagnostic set of said diagnostic history, said ranking of at least one of said minimal diagnostics being substantially based on results of said historic persistence weighting calculation.

5. The method according to claim 3, further comprising a step of prioritizing elements of said minimal diagnostic set.

6. The method according to claim 1, wherein said step of ranking at least one of the elements of said minimal diagnostic set comprises a step of ranking problems resulting from minimal diagnostics.

7. The method according to claim 6, wherein said historic persistence weighting is calculated for each problem of a plurality of problems resulting from said minimal diagnostics, said ranking of problems being substantially based on results of said historic persistence weighting calculation.

8. The method according to claim 1, further comprising a step of selecting at least one notification message capable of being received represented by a node of said critical event chart and a step of identifying elements of said minimal diagnostic set capable of resulting in the generation of said at least one selected notification message, said identified elements forming part of said diagnostic report.

9. The method according to claim 8, further comprising a step of calculating a remaining distance before an imminent effect for at least one of said identified elements, said remaining distance being calculated as a function of the number of elements that do not form part of said minimal diagnostic set and a malfunction of which is necessary to the generation of said at least one selected notification message.

10. The method according to claim 8, further comprising a step of obtaining and assigning attributes to said identified elements.

11. The method according to claim 1, further comprising a step of selecting at least one failure resolution procedure involving at least one element of said minimal diagnostic set.

12. The method according to claim 1, according to which said critical event chart is substantially generated by instantiation of at least one generic subchart.

13. A computer program comprising instructions stored on a nontransient memory suitable for the implementation of each of the steps of the method according to claim 1 when said program is executed on a computer.

14. An aircraft maintenance system comprising a calculator that implements each of the steps of the method according to claim 1.

15. An aircraft comprising the system according to claim 14.

16. The method according to claim 1, further comprising identifying and selecting a troubleshooting procedure being common to a resolution of diagnostic problems for resolving at least one diagnostic problem.

* * * * *